US012804716B2

(12) United States Patent
Deenoo et al.

(10) Patent No.: US 12,804,716 B2
(45) **Date of Patent: *Nov. 17, 2026**

(54) RADIO LINK MONITORING IN SHARED SPECTRUM

(71) Applicant: InterDigital Patent Holdings, Inc., Wilmington, DE (US)

(72) Inventors: Yugeswar Deenoo, Chalfont, PA (US); Mouna Hajir, Montreal (CA); J. Patrick Tooher, Montreal (CA); Ghyslain Pelletier, Montreal (CA); Paul Marinier, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/598,565

(22) Filed: Mar. 7, 2024

(65) Prior Publication Data

US 2024/0215071 A1 Jun. 27, 2024

Related U.S. Application Data

(63) Continuation of application No. 17/253,873, filed as application No. PCT/US2019/037712 on Jun. 18, 2019, now Pat. No. 11,956,822.

(Continued)

(51) Int. Cl.
*H04W 74/0816* (2024.01)
*H04B 17/309* (2015.01)

(Continued)

(52) U.S. Cl.
CPC ...... *H04W 74/0816* (2013.01); *H04B 17/309* (2015.01); *H04W 72/0453* (2013.01); *H04W 74/002* (2013.01); *H04W 74/0841* (2013.01)

(58) Field of Classification Search
CPC ........... H04W 72/0453; H04W 74/002; H04W 74/0816; H04W 74/0841
See application file for complete search history.

(56) References Cited

U.S. PATENT DOCUMENTS 10,200,904 B2 2/2019 Zhang et al.
11,159,653 B2 10/2021 Basu Mallick et al.

(Continued)

FOREIGN PATENT DOCUMENTS

CN 106304092 A 1/2017
CN 107079494 A 8/2017

(Continued)

OTHER PUBLICATIONS

3GPP TR 38.889 V16.0.0, "Study on NR-based access to access to unlicensed spectrum", 3rd Generation Partnership Project; Technical Specification Group Radio Access Network; Study on NR-based access to unlicensed spectrum (Release 16), 2018-12, 119 pages.

(Continued)

*Primary Examiner* — James P Duffy
(74) *Attorney, Agent, or Firm* — Flaster Greenberg, P.C.

(57) ABSTRACT

A WTRU may be configured to perform radio link monitoring (RLM) based on RLM reference signals (RLM-RSs) transmitted in a cell operating in an unlicensed spectrum. The WTRU may evaluate a radio link failure (RLF) status for the cell using a first RLM criteria based on the RLM-RSs. A transmission instance of the RLM-RSs may be skipped, for example, due to a listen before talk (LBT) failure at a gNodeB (gNB). The WTRU may adapt or change the first RLM criteria and/or evaluate the RLF status of the cell operating in the unlicensed spectrum using a second RLM criteria based on determining that the transmission instance of the RLM-RSs was skipped. The first RLM criteria may correspond to a first RLM process that utilizes a first set of RLM parameters. The second RLM criteria may (Continued)

correspond to a second RLM process that utilizes a second set of RLM parameters.

20 Claims, 6 Drawing Sheets

Related U.S. Application Data

(60) Provisional application No. 62/790,183, filed on Jan. 9, 2019, provisional application No. 62/715,641, filed on Aug. 7, 2018, provisional application No. 62/686,758, filed on Jun. 19, 2018.

(51) Int. Cl.
*H04W 72/0453* (2023.01)
*H04W 74/00* (2009.01)
*H04W 74/0833* (2024.01)

(56) References Cited

U.S. PATENT DOCUMENTS

| | | | | |
|---|---|---|---|---|
| 11,956,822 | B2 * | 4/2024 | Deenoo | H04B 17/309 |
| 2015/0334736 | A1 | 11/2015 | Chandra et al. | |
| 2016/0100433 | A1 | 4/2016 | Vajapeyam et al. | |
| 2016/0381589 | A1 | 12/2016 | Zhang et al. | |
| 2017/0111921 | A1 | 4/2017 | Fan et al. | |
| 2017/0231005 | A1 | 8/2017 | Babaei et al. | |
| 2017/0318607 | A1 | 11/2017 | Tiirola et al. | |
| 2018/0007575 | A1 | 1/2018 | Singhal et al. | |
| 2018/0020478 | A1 | 1/2018 | Derham et al. | |
| 2018/0035311 | A1 | 2/2018 | Yang et al. | |
| 2018/0042048 | A1 | 2/2018 | Hugi et al. | |
| 2018/0048498 | A1 | 2/2018 | Stern-Berkowitz et al. | |
| 2018/0176961 | A1 | 6/2018 | Babaei et al. | |
| 2019/0200379 | A1 | 6/2019 | Wang et al. | |
| 2019/0215217 | A1 | 7/2019 | Kim et al. | |
| 2019/0230706 | A1 | 7/2019 | Li et al. | |
| 2019/0313449 | A1 | 10/2019 | Tsai et al. | |
| 2019/0349815 | A1 | 11/2019 | Tiirola et al. | |
| 2019/0387546 | A1 | 12/2019 | Li et al. | |
| 2020/0037359 | A1 | 1/2020 | Wang et al. | |
| 2020/0260303 | A1 * | 8/2020 | Chen | H04W 52/0212 |
| 2020/0344595 | A1 * | 10/2020 | Chen | H04W 72/0453 |
| 2020/0344819 | A1 | 10/2020 | Myung et al. | |
| 2020/0367079 | A1 * | 11/2020 | Chen | H04W 24/04 |
| 2020/0374923 | A1 | 11/2020 | Cheng et al. | |
| 2021/0058964 | A1 | 2/2021 | Hooli et al. | |
| 2021/0076240 | A1 | 3/2021 | Koziol et al. | |
| 2021/0092622 | A1 | 3/2021 | Tiirola et al. | |
| 2021/0168862 | A1 * | 6/2021 | Murray | H04W 74/0816 |
| 2021/0195639 | A1 * | 6/2021 | Kim | H04W 16/14 |
| 2022/0110153 | A1 * | 4/2022 | Wu | H04W 74/0808 |

FOREIGN PATENT DOCUMENTS

| | | | |
|---|---|---|---|
| CN | 107431591 | A | 12/2017 |
| CN | 107980211 | A | 5/2018 |
| EP | 2916581 | A1 | 9/2015 |
| EP | 3252971 | A1 | 12/2017 |
| RU | 2541877 | C2 | 2/2015 |
| WO | WO 2016/054584 | A2 | 4/2016 |
| WO | WO 2017/130771 | A1 | 8/2017 |
| WO | WO 2018/040818 | A1 | 3/2018 |
| WO | WO 2018/062841 | A1 | 4/2018 |
| WO | WO 2018/085145 | A1 | 5/2018 |
| WO | WO 2019/050789 | A1 | 3/2019 |

OTHER PUBLICATIONS

3rd Generation Partnership Project {3GPP), Random access in NR-Unlicensed, InterDigital, 3GPP TSG-RAN WG2 Meeting #103bis, Chengdu, China, Oct. 2018, R2-1814007.

Third Generation Partnership Project (3GPP); Technical Specification Group Radio Access Network, NR "Medium Access Control (MAC) protocol specification (Release15)"; 3GPP TS 38.321 V15.0.0 (Dec. 2017), Valbonne, France, 55 pages.

Third Generation Partnership Project (3GPP); Technical Specification Group Radio Access Network NR, "Radio Resource Control (RRC) protocol specification (Release 15)"; 3GPP TS 38.331 V15.0.0 (Dec. 2017), Valbonne, France, 188 pages.

Third Generation Partnership Project (3GPP); Technical Specification Group Radio Access Network; "Evolved Universal Terrestrial Radio Access (E-UTRA)", Physical layer procedures (Release 15); 3GPP TS 36.213 V15.0.0 (Dec. 2017), Valbonne, France, 493 pages.

Third Generation Partnership Project (3GPP); Technical Specification Group Radio Access Network; "Study on Licensed-Assisted Access to Unlicensed Spectrum (Release 13)", 3GPP TR 36.889 V13.0.0 (Jun. 2015), Valbonne, France, 285 pages.

Third Generation Partnership Project (3GPP); R1-1803602, "LS on BWP switching delay", RAN4; 3GPP TSG RAN WG 1 Meeting #92bis, Feb. 26-Mar. 2, 2018, Athens, Greece, 2 pages.

Third Generation Partnership Project (3GPP); R1-1806968, "BWP operation in unlicensed spectrum", InterDigital, Inc.; 3GPP RAN WG1 Meeting #93, May 21-25, 2018, Busan, Korea, 4 pages.

Third Generation Partnership Project (3GPP); R1-1809086, "On NR-U Frame Structure", InterDigital, Inc.; 3GPP TSG RAN WG 1 Meeting #94, Aug. 20-24, 2018, Gothenburg, Sweden, 5 pages.

Third Generation Partnership Project (3GPP); R1-1811203, "Design aspects of NR-U uplink signals and channels", InterDigital, Inc.; 3GPP TSG RAN WG 1 Meeting #94 bis, Oct. 8-12, 2018, Chengdu, China, 12 pages.

Third Generation Partnership Project (3GPP); R1-1811205, "Initial Access and Mobility Procedures in NR-U", InterDigital, Inc.; 3GPP TSG RAN WG 1 Meeting #94 bis, Oct. 8-12, 2018, Chengdu, China, 11 pages.

Third Generation Partnership Project (3GPP); R1-1813219, "Design aspects of NR-U uplink signals and channels", InterDigital, Inc.; 3GppTSG RAN WG 1 Meeting #95, Nov. 12-16, 2018, Spokane, USA, 15 pages.

Third Generation Partnership Project (3GPP); R1-1900787, "Initial Access and Mobility Procedures in NR-U", InterDigital, Inc.; 3GPP TSG RAN WG 1 Ad-hoc Meeting 1901, Jan. 21-25, 2019, Taipei, Taiwan, 9 pages.

Third Generation Partnership Project (3GPP); R1-1902588, "Initial Access and Mobility Procedures in NR-U", InterDigital, Inc.; 3GPP TSG RAN WG 1 #96, Feb. 25-Mar. 1, 2019, Athens, Greece, 8 pages.

Third Generation Partnership Project (3GPP); R1-1906763, "Initial Access and Mobility Procedures in NR-U", InterDigital, Inc.; 3GPP TSG RAN WG 1 #97, May 13-17, 2019, Reno, USA, 4 pages.

Third Generation Partnership Project (3GPP); R1-1909011, "Initial Access and Mobility Procedures in NR-U", InterDigital, Inc.; 3GPP TSG RAN WG 1 #98, Aug. 26-30, 2019, Prague, CZ, 5 pages.

Third Generation Partnership Project (3GPP); R1-1910940, "Initial Access and Mobility Procedures in NR-U", InterDigital, Inc.; 3GPP TSG RAN WG 1 #98bis, Oct. 14-20, 2019, Chongqing, China, 5 pages.

Third Generation Partnership Project (3GPP); R1-1912697, "Initial Access and Mobility Procedures in NR-U", InterDigital, Inc.; 3GPP TSG RAN WG 1 #99, Nov. 18-22, 2019, Reno, U.S.A., 5 pages.

Third Generation Partnership Project (3GPP); R1-1904854, "Initial Access and Mobility Procedures in NR-U", InterDigital, Inc.; 3GPP TSG RAN WG 1 #96bis, Apr. 8-12, 2019, Xi'an, China, 7 page.

Third Generation Partnership Project (3GPP); R2-1809613, "Random access in NR-Unlicensed", InterDigital, Inc.; 3GPP TSG-RAN WG2 Meeting NR AH 1807, Jul. 2-6, 2018, Montreal, Canada, 5 pages.

Third Generation Partnership Project (3GPP); R2-1811458, "Random access in NR-Unlicensed", InterDigital; 3GPP TSG-RAN WG2 Meeting #103, Aug. 20-24, 2018, Gothenburg, Sweden, 5 pages.

Third Generation Partnership Project (3GPP); R2-1811459, "SR in NR-U", InterDigital; 3GPP TSG-RAN WG2 Meeting #103, Aug. 20-24, 2018, Gothenburg, Sweden, 5 pages.

(56) References Cited

OTHER PUBLICATIONS

Third Generation Partnership Project (3GPP); R2-1814007, "Random access in NR-Unlicensed", InterDigital; 3GPP TSG-RAN WG2 Meeting # 103bis, Oct. 8-12, 2018, Chengdu, China, 5 pages.
Third Generation Partnership Project (3GPP); R2-1816775, "Text Proposal for Scheduling Request in NR-U", InterDigital, Qualcomm, Panasonic, ZTE, Charter Communications Inc.; 3GPP TSG-RAN WG2 Meeting #104, Nov. 12-16, 2018, Spokane, U.S.A., 2 pages.
Third Generation Partnership Project (3GPP); R2-1816776, "Random access in NR-Unlicensed", InterDigital; 3GPP TSG-RAN WG2 Meeting # 104, Nov. 12-16, 2018, Spokane, U.S.A., 4 pages.
Third Generation Partnership Project (3GPP); R2-1901456, "Random access in NR-Unlicensed", InterDigital; 3GPP TSG-RAN WG2 Meeting #105, Feb. 25-Mar. 1, 2019, Athens, Greece, 4 pages.
Third Generation Partnership Project (3GPP); R2-1901457, "SR in NR-U", InterDigital; 3GPP TSG-RAN WG2 Meeting #105, Feb. 25-Mar. 1, 2019, Athens, Greece, 4 pages.
Third Generation Partnership Project (3GPP); R2-1903554, "Random access in NR-Unlicensed", InterDigital; 3GPP TSG-RAN WG2 Meeting #105 bis, Apr. 8-12, 2019, Xi'An, China, 4 pages.
Third Generation Partnership Project (3GPP); R2-1906402, "Random access in NR-Unlicensed", InterDigital; 3GPP RAN WG2 Meeting #106, May 13-17, 2019, Reno, USA, 5 pages.
Third Generation Partnership Project (3GPP); R2-1909603, "Random access in NR-Unlicensed", InterDigital; 3GPP RAN WG2 Meeting #107, Aug. 26-30, 2019, Prague, Czech, 4 pages.
Third Generation Partnership Project (3GPP); R2-1912888, "Random access in NR-Unlicensed", InterDigital; 3GPP RAN WG2 Meeting #107 bis, Oct. 14-18, 2019, Chongqing, China, 2 pages.
Third Generation Partnership Project (3GPP); RP-172021, "Revised SID on NR-based Access to Unlicensed Spectrum", Qualcomm Incorporated; 3GPP TSG RAN Meeting #77, Sep. 11-14, 2017, Sapporo, Japan, 5 pages.
InterDigital Inc. "BWP operation in unlicensed spectrum", 3GPP RAN WG1 Meeting #93 Busan, Korea, May 21-25, 2018 R1-1806968.
3rd Generation Partnership Project; Technical Specification Group Radio Access Network NR, Radio Resource Control (RRC) protocol specification, (Release 15), 3GPP TS 38.331 V15.0.0, Dec. 2017, 188 pages.
3rd Generation Partnership Project, 3GPP TSG RAN Meeting #77 RP-172021 "Study on NR-based Access to Unlicensed Spectrum", Sapporo, Japan, Sep. 11-14, 2017, 5 pages.
3rd Generation Partnership Project, 3GPP TSG RAN WG1 Meeting #92bis, R1-1803602 "LS on BWP switching delay", Sanya, China, Apr. 16-20, 2018, 2 pages.
Third Generation Partnership Project (3GPP), "On Initial Access for NR Unlicensed Spectrum", R1-1807037, InterDigital Inc., 3GPP TSG RAN WG1 Meeting #93, Busan, South Korea, May 21-25, 2018, 6 pages.

* cited by examiner

100

RADIO LINK MONITORING IN SHARED SPECTRUM

CROSS-REFERENCE TO RELATED CASES

This application is a continuation of U.S. Non-Provisional application Ser. No. 17/253,873, filed Dec. 18, 2020, which is the National Stage Entry under 35 U.S.C. § 371 of Patent Cooperation Treaty Application No. PCT/US2019/037712, filed Jun. 18, 2019, which claims the benefit of U.S. Provisional Patent Application No. 62/686,758, filed Jun. 19, 2018, U.S. Provisional Patent Application No. 62/715,641, filed Aug. 7, 2018, and U.S. Provisional Patent Application No. 62/790,183, filed Jan. 9, 2019, the contents of which are hereby incorporated by reference in their entireties.

BACKGROUND

Mobile communications using wireless communication continue to evolve. A fifth generation may be referred to as 5G. A previous (legacy) generation of mobile communication may be, for example, fourth generation (4G) long term evolution (LTE).

SUMMARY

Systems, methods, and instrumentalities for radio link monitoring in shared spectrum may be disclosed herein. A wireless transmit receive unit may be configured to determine a channel status. For example, a channel status may correspond to a relative state of the channel, such as one or more of clear (e.g., high quality, low usage, etc.), busy (e.g., frequent usage, good or bad quality when available, etc.), bad/poor (e.g., low quality even when channel usage is low), etc.

A wireless transmit/receive unit (WTRU) may be configured to utilize techniques to determine or otherwise differentiate between a bad channel (e.g., poor channel conditions) and a busy channel (e.g., high usage and/or interference levels in a channel with otherwise acceptable channel conditions). The WTRU may evaluate the channel and identify a level of uncertainty and/or ambiguity when processing measurement samples as to whether measurements correspond to a bad channel, a poor channel, and/or both.

A WTRU may be configured to perform radio link monitoring (RLM) measurements in a cell. The cell may transmit radio link monitoring reference signals (RLM-RSs) in an unlicensed spectrum. A WTRU may be configured to perform RLM measurements based on the RLM-RSs. The WTRU may measure the RLM-RSs. The WTRU may evaluate a radio link failure (RLF) status for the cell using a first RLM criteria based on determining that a transmission instance of the RLM-RSs was transmitted in the cell. For example, the WTRU may evaluate the RLF status for the cell using the first RLM criteria based on measuring the RLM-RSs. A transmission instance of the RLM-RSs may be skipped, for example, due to a listen before talk (LBT) failure of a gNodeB (gNB). The WTRU may determine that a transmission instance of the RLM-RSs was skipped. The WTRU may adapt or change the first RLM criteria and/or evaluate the RLF status of the cell operating in the unlicensed spectrum using a second RLM criteria based on determining that the transmission instance of the RLM-RSs was skipped. The first RLM criteria may correspond to a first RLM process that utilizes a first set of RLM parameters. The second RLM criteria may correspond to a second RLM process that utilizes a second set of RLM parameters.

The WTRU may be indicated or determine that the transmission instance of the RLM-RSs was skipped. For example, the WTRU may be configured to receive an indication from the gNB that indicates that the transmission instance of the RLM-RSs was skipped.

The WTRU may be configured to determine that the transmission instance of the RLM-RSs was skipped based on one or more detected or implicit criteria. For example, the WTRU may fail to detect a characteristic associated with the RLM-RSs during the transmission instance. The WTRU may determine that the transmission instance of the RLM-RSs was skipped based on failing to detect the characteristic associated with the RLM-RSs during the transmission instance. The characteristic may include one or more of a scrambling identification (ID) associated with the RLM-RSs, a cyclic shift, and/or the like. The WTRU may be configured to measure a received signal strength indicator (RSSI) of a resource of the cell. The WTRU may determine that the measured RSSI is greater than a threshold. The WTRU may be configured to determine that the transmission instance of the RLM-RSs was skipped based on the determination that the measured RSSI is greater than the threshold. The WTRU may be configured to measure a power on one or more resource elements that are blanked by the gNB. The WTRU may determine that the measured power is above a threshold. The WTRU may be configured to determine that the transmission instance of the RLM-RSs was skipped based on the determination that the measured power is above the threshold. The WTRU may be configured to determine that the transmission instance of the RLM-RSs was skipped based on a condition or a combination of conditions. For example, the WTRU may be configured to determine that the transmission instance of the RLM-RSs was skipped when the RSSI in the resource elements associated with RLM-RS is above a first threshold and the RSRP of the resource elements associated with RLM-RS is below a second threshold.

The first RLM criteria and the second RLM criteria may be different. The second RLM criteria may include the use of a no-sync (NS) indication, for example, when an RLM-RS is determined (e.g., by the WTRU) to be not received. The second RLM criteria may include a counter of no-sync (NS) indications. The second RLM criteria may include a fractional counter of out-of-sync (OOS) indications. The second RLM criteria may include a fractional increment of an OOS counter. The first RLM criteria and the second RLM criteria may include different conditions requiring a number of consecutive OOS indications to declare RLF. For example, the number of consecutive OOS indications required in the second RLM criteria may be greater than the first number of consecutive OOS indications required in the first RLM criteria.

The second RLM criteria may include a calculation of a block error rate (BLER). For example, the WTRU may be configured to calculate the BLER by applying a negative offset increment on the BLER for an indication interval. The WTRU may be configured to compare the calculated BLER with a threshold. The WTRU may be configured to generate at least one of an OOS indication, an in-sync (IS) indication, or an NS indication based on the comparison.

The WTRU may be configured to perform LBT in the cell in the unlicensed spectrum. The WTRU may defer a number of uplink (UL) transmissions. The WTRU may determine that a number of deferred UL transmissions exceeds a threshold. The WTRU may send an indication of RLF based on the determination that the number of the deferred UL transmissions exceeds the threshold. The WTRU may determine that UL access latency exceeds a threshold. The WTRU may send an indication of RLF based on the determination that the UL access latency exceeds the threshold.

DETAILED DESCRIPTION

Figure 1A:
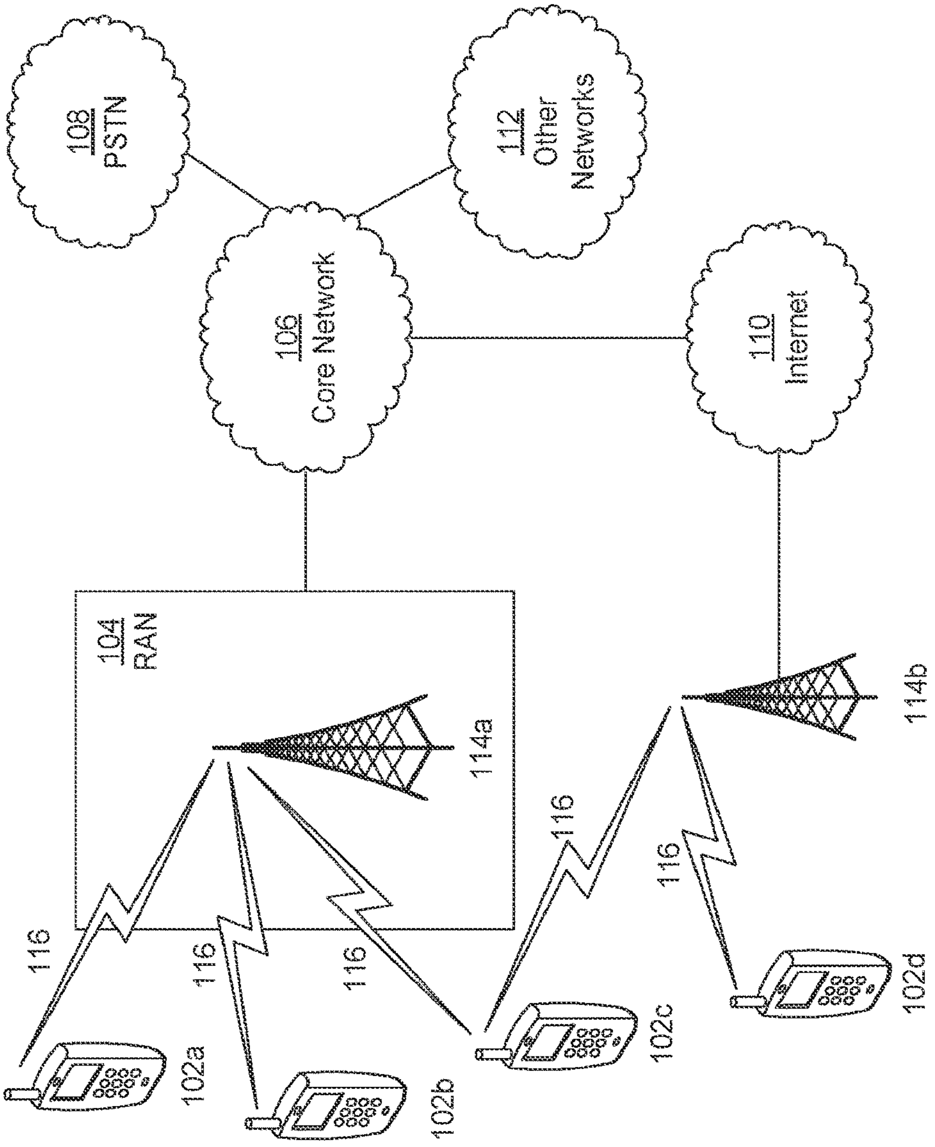
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., a eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
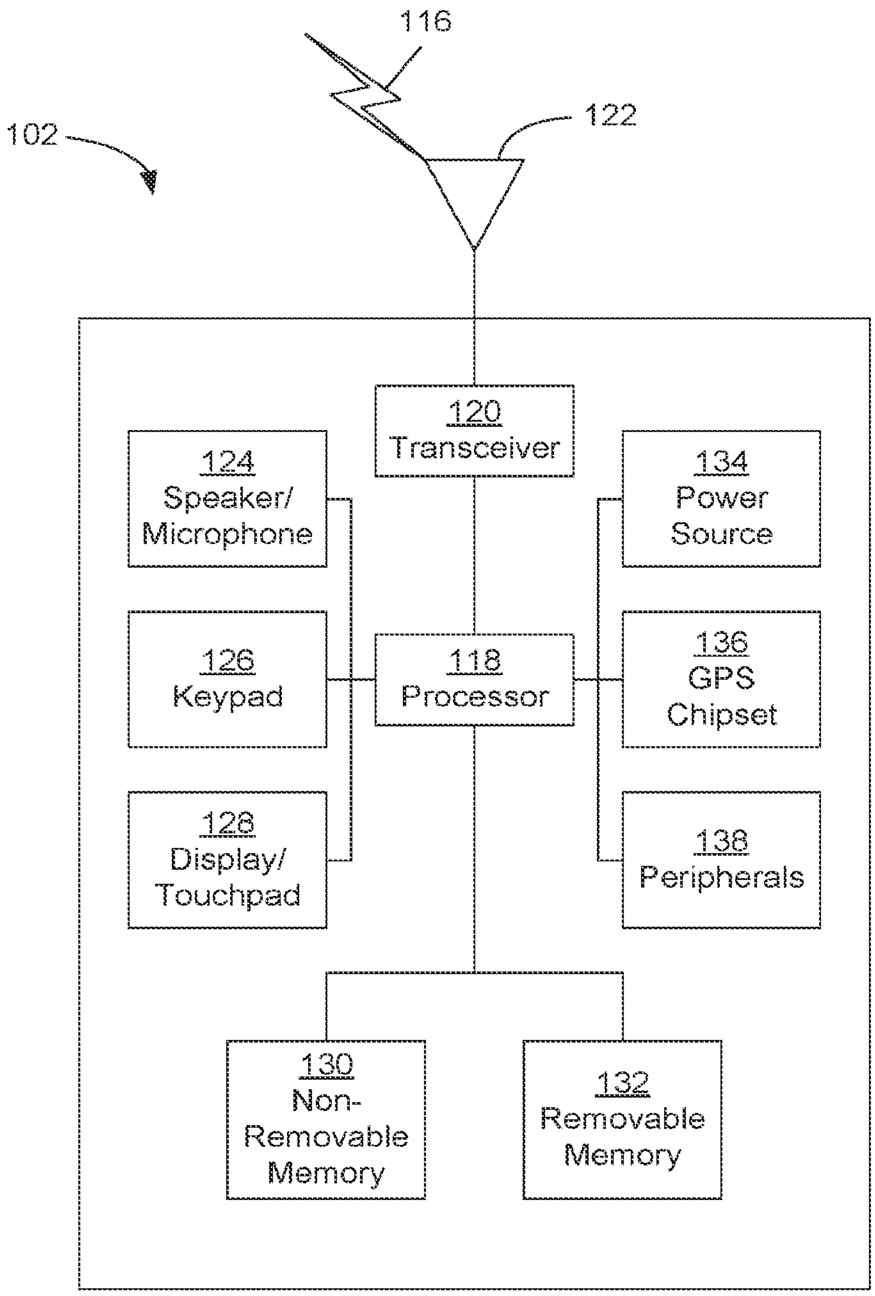
FIG. 1B is a system diagram illustrating an example wireless transmit/receive unit (WTRU) that may be used within the communications system illustrated in FIG. 1A according to an embodiment.
Figure 1C:
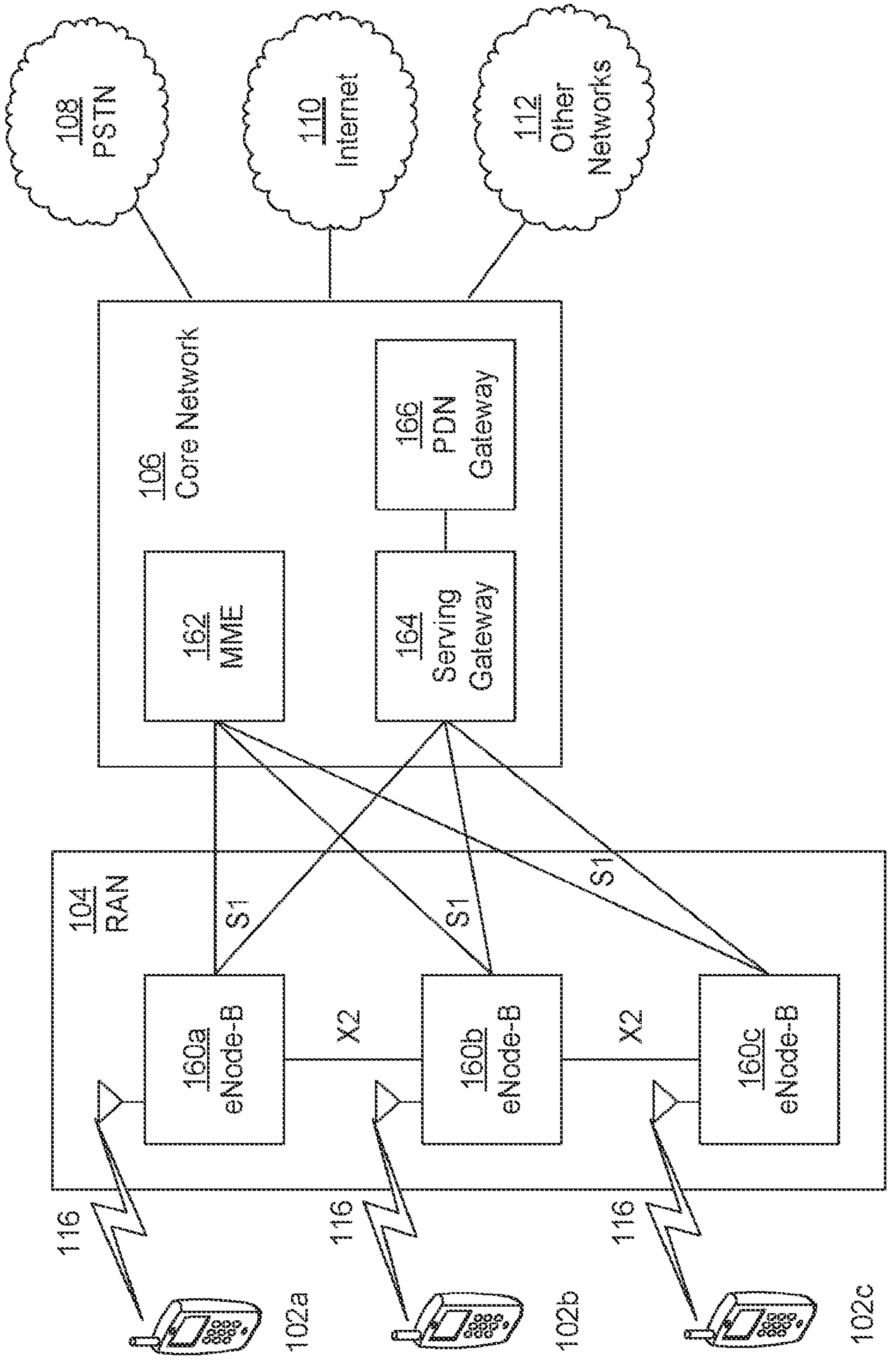
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

FIG. 10 is a system diagram illustrating the RAN 104 and the CN 106 according to an embodiment. As noted above, the RAN 104 may employ an E-UTRA radio technology to communicate with the VVTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 10, the eNode-Bs 160*a*, 160*b*, 160*c* may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
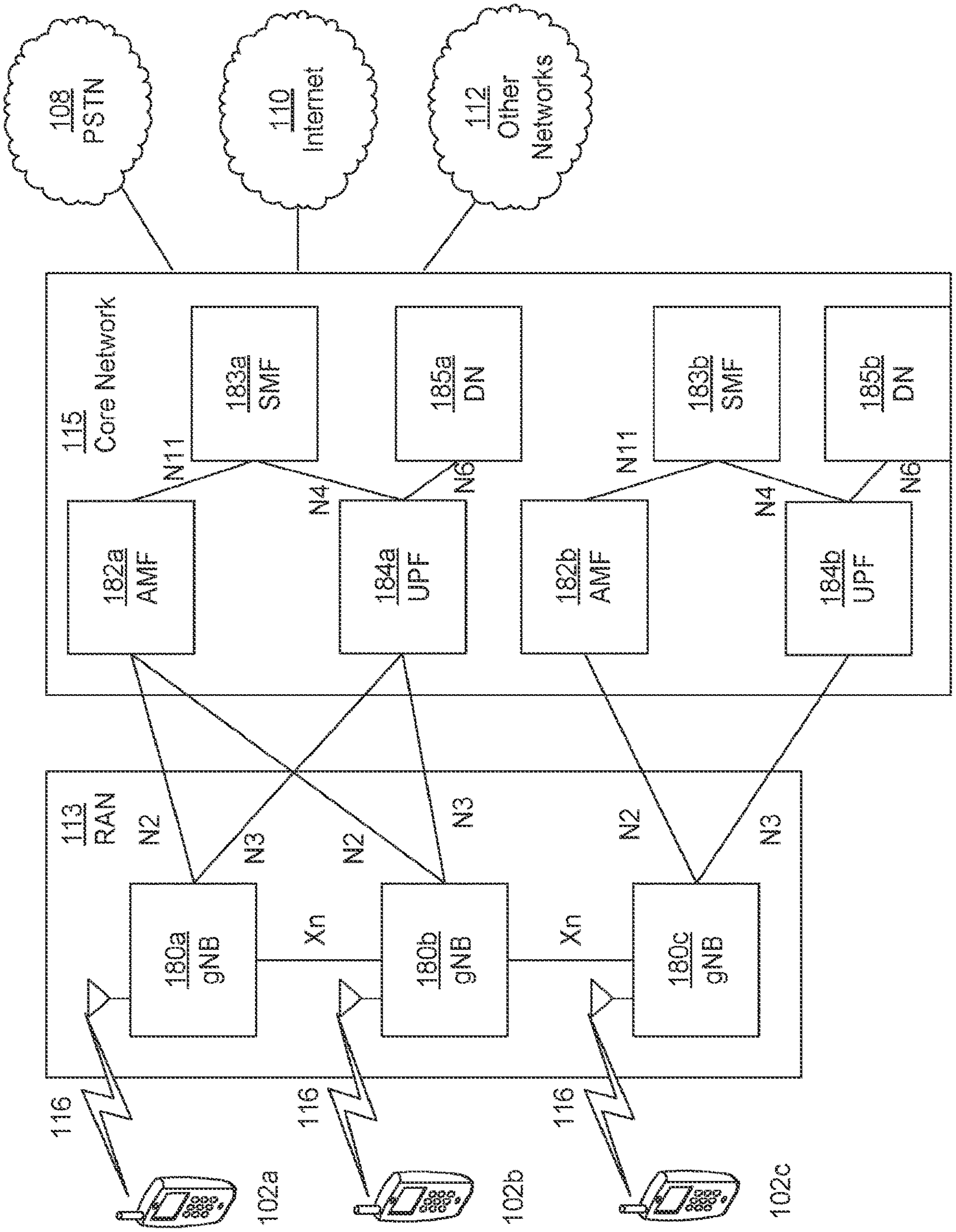
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the VVTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102_a_, 102_b_, 102_c_ may be connected to a local Data Network (DN) 185_a_, 185_b_ through the UPF 184_a_, 184_b_ via the N3 interface to the UPF 184_a_, 184_b_ and an N6 interface between the UPF 184_a_, 184_b_ and the DN 185_a_, 185_b_.

In view of FIGS. 1A-1D, and the corresponding description of FIGS. 1A-1D, one or more, or all, of the functions described herein with regard to one or more of: WTRU 102_a-d_, Base Station 114_a-b_, eNode-B 160_a-c_, MME 162, SGW 164, PGW 166, gNB 180_a-c_, AMF 182_a-b_, UPF 184_a-b_, SMF 183_a-b_, DN 185_a-b_, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The term "network" as used herein may refer to one or more gNBs, which may be associated with one or more transmission/reception points (TRPs) or any other node in a radio access network. PDU may refer to protocol data unit.

The term "shared spectrum" as used herein may refer to any spectrum that is shared between multiple operators and/or multiple technologies, for example 3GPP, WiFi, radar, satellite, and the like. "Shared spectrum" as used herein may include lightly licensed spectrum, licensed spectrum that is shared between operators, and/or unlicensed spectrum. The terms "shared" and "unlicensed" may be used interchangeably herein. Although the techniques described herein may be applicable to shared spectrum scenarios, the techniques may have applicability to non-shared spectrum. The examples should not be interpreted to only shared spectrum deployments unless specifically noted herein.

Next-generation air interfaces, including further evolution of LTE Advanced Pro and New Radio (NR), may support a wide range of use cases with varying service requirements. For example, low-overhead low-data-rate power-efficient services (e.g., mMTC), ultra-reliable low-latency services (e.g., URLLC), and/or high-data-rate mobile broadband services (e.g., eMBB) may be supported. Diverse wireless transmit/receive unit (WTRU) capabilities may be supported. For example, low-power low-bandwidth VVTRUs, VVTRUs that are capable of very wide bandwidth (e.g., 80 MHz), and/or WTRUs with support for high frequencies (e.g., greater than 6 GHz) may be supported. Different spectrum usage models may be supported. For example, stationary/fixed and/or high speed train scenarios may be supported. Architecture that is flexible enough to adapt to diverse deployment scenarios may be used. For example, one or more of standalone, non-standalone (e.g., with assistance from another air interface), centralized, virtualized, and/or distributed over ideal/non-ideal backhaul architectures may be used.

A WTRU may operate using bandwidth parts (BWPs) in a carrier, e.g., in NR. A WTRU may access a cell that uses a (e.g., initial) BWP. The WTRU may be configured with a set of BWPs, for example, to continue operation. For example, a WTRU may have one active BWP at any given moment. A BWP (e.g., each BWP) may be configured with a set of control resource sets (CORESETs). A WTRU may blind decode physical downlink control channel (PDCCH) candidates for scheduling within a CORESET.

NR may support variable transmission duration(s) and/or feedback timing. A physical downlink shared channel (PDSCH) and/or physical uplink shared channel (PUSCH) transmission may occupy a subset (e.g., contiguous subset) of symbols of a slot. The subset of symbols may be associated with variable transmission duration(s). A downlink control information (DCI) for a DL assignment may include an indication of timing of feedback for a WTRU (e.g., by pointing to a specific PUCCH resource), for example with variable feedback timing.

NR may support multiple types of physical uplink control channel (PUCCH) resources. For example, NR may support a short PUCCH and a long PUCCH. A short PUCCH may be transmitted using 1 or 2 OFDM symbols. A long PUCCH may be transmitted using, for example, 14 orthogonal frequency-division multiplexing (OFDM) symbols. PUCCH types (e.g., each PUCCH type) may have multiple formats. The formats may depend on a type and/or a size of a corresponding payload.

Beamforming may be used to compensate for increased pathloss at higher frequencies (e.g., greater than 6 GHz). A relatively large number of antenna elements may be used to achieve a higher beamforming gain.

Analog and/or hybrid beamforming may be used to reduce implementation costs (e.g., to reduce a number of RF chains). Analog and/or hybrid beams may be multiplexed in time. Beamforming may be applied for one or more of Sync, PBCH, or Control channels, for example to provide cell wide coverage. The term "beam sweep" as used herein may refer to transmission and/or reception of beamformed channels (e.g., multiplexed in time and/or frequency and/or space.

The term "reference signal" as used herein may refer to a signal, preamble, or system signature that may be received and/or transmitted by a WTRU (e.g., for one or more purposes as described herein). Different reference signals may be defined for beam management in DL and/or UL. For example, downlink beam management may use one or more of channel state information reference signal (CSI-RS), demodulation reference signal (DMRS), synchronization signal, or the like. Uplink beam management may use one or more of sounding reference signal (SRS), DMRS, random-access channel (RACH), or the like.

Operation may occur in a shared spectrum deployment. Operation in an unlicensed frequency band may be subject to limits on one or more of transmit power control (TPC), radio frequency (RF) output power, or power density (e.g., as given by mean effective isotropic radiated power (EIRP) and/or mean EIRP density at the highest power level). Operation in an unlicensed frequency band may be subject to requirements on a transmitted out of band emission(s). The requirements may be specific to bands and/or geographical locations.

Operation in an unlicensed frequency band may be subject to requirements of the Nominal Channel Bandwidth (NCB) and/or the Occupied Channel Bandwidth (OCB). OCB may be defined for unlicensed spectrum in the 5 GHz region. For example, the NCB may be the widest band of frequencies inclusive of guard bands assigned to a single channel. The NCB may be at least 5 MHz. The OCB may include the bandwidth containing 99% of the power of the signal. The OCB may be between 80% and 100% of the declared NCB. A device may be allowed to operate temporarily in a mode where the device's OCB is reduced, for example, during an established communication. the device's OCB may be reduced to as low as 40% of the device's NCB (e.g., with a minimum of 4 MHz).

Channel access in an unlicensed frequency band may use a Listen-Before-Talk (LBT). LBT may be mandated (e.g., independently of) whether the channel is occupied.

LBT may be characterized, for example, for frame-based systems. LBT may be characterized by one or more of a Clear Channel Assessment (CCA) time (e.g., ~20 μs), a Channel Occupancy time (e.g., minimum 1ms, maximum 10ms), an idle period (e.g., minimum 5% of channel occupancy time), a fixed frame period (e.g., equal to the channel occupancy time+idle period), a short control signaling transmission time (e.g., maximum duty cycle of 5% within an observation period of 50 ms), or a CAA energy detection threshold.

LBT may be characterized, for example, for load-based systems. In load-based systems, transmit/receive structure may not be fixed in time. LBT may be characterized by a number N corresponding to a number of clear idle slots in an extended CCA (e.g. instead of the fixed frame period). N may be selected randomly within a range.

Deployment scenarios may include different standalone NR-based operations, different variants of dual connectivity operation and/or different variants of carrier aggregation (CA). Variants of dual connectivity operation may include one or more of EN-DC with at least one carrier operating according to the LTE radio access technology (RAT) or NR DC with at least two set of one or more carriers operating according to the NR RAT. Variants of CA may include different combinations of zero or more carriers of each of LTE and NR RATs.

A listen-before-talk (LBT) may be used by an equipment where the equipment applies a clear channel assessment (CCA) check before using a channel. The CCA may utilize energy detection and/or other approaches to determine the presence or absence of other signals on a channel, for example, in order to determine if a channel is occupied or clear, respectively. Usage of LBT in the unlicensed bands may be mandated. Carrier sensing (e.g., via LBT) may be a way for fair sharing of unlicensed spectrum. Carrier sensing (e.g., via LBT) may be considered to be a vital feature for fair and/or friendly operation in the unlicensed spectrum in a single global solution framework.

Discontinuous transmission may occur on a carrier with limited maximum transmission duration. In an unlicensed spectrum, channel availability may not be guaranteed. Continuous transmission may be prohibited. Limits on the maximum duration of a transmission burst in the unlicensed spectrum may be imposed. Discontinuous transmission with the limited maximum transmission duration may be a functionality for license assisted access (LAA).

Carrier selection may occur. Carrier selection may be used for LAA nodes to select carriers (e.g., with low interference and that achieve co-existence with other unlicensed spectrum deployments). There may be a large available bandwidth of unlicensed spectrum.

TPC may be a requirement by which a transmitting device may be able to reduce transmit power (e.g., in a proportion of 3 dB or 6 dB) compared to a maximum nominal transmit power.

Radio resource management (RRM) measurements (e.g., including cell identification) may occur. RRM measurements (e.g., including cell identification) may enable mobility between SCells and/or robust operation in an unlicensed band.

CSI measurement (e.g., including channel and/or interference) may occur. A WTRU operating in an unlicensed carrier may support frequency/time estimation and/or synchronization, for example, to enable RRM measurements and/or for successful reception of information on the unlicensed band.

A transmission instance of RLM-RS may be interfered or skipped. The interfered or skipped transmission instance of RLM-RS may be due to an LBT failure (e.g., of a gNB). Transmissions in an unlicensed spectrum may be preceded by a LBT period or procedure (e.g., at an gNB). Performing an LBT may enable a co-existence with 3GPP and non-3GPP neighbors (e.g., WiFi). RLM (e.g., an RLM process) may rely on periodic transmissions of reference signals. The reference signals may include, for example, an RLM-RS(s). When used herein, the term RLM-RS(s) may refer to any reference signals used by a WTRU to monitor radio link conditions. For example, RLM-RS(s) may correspond to one or more synchronization signals; or blocks, one or more CSI-RSs, and/or other types of reference signals.

In some communication scenarios—for example an unlicensed spectrum—periodic transmissions of an RLM-RS(s) may not be guaranteed. For example, RLM-RS transmissions may be subject to transmission uncertainty since the channel may already be occupied which could result in a failed LBT. For example, upon failure of LBT (e.g., due to the channel being occupied by another user or another radio access technology), a transmission instance of RLM-RS(s) may be skipped. A WTRU may or may not treat an absence of RLM-RS(s) as an out-of-sync (OOS) condition, for example depending on its configured mode and/or other observed criterion. As an example, a WTRU may fail to detect an RLM-RS transmission due to an interference from a hidden node.

The WTRU may determine a temporary interference condition as an OOS condition. An OOS indication may be triggered during a busy channel. The OOS indication triggered during the busy channel may not be indicative of a channel quality. The OOS indication triggered during the busy channel may result in transient changes to a perceived cell coverage (e.g., at the WTRU). The WTRU may trigger radio link failure (RLF) and/or may re-establish to the same cell. Interruptions, data loss, and/or unnecessary signaling may ensue. A large number of WTRUs on the network may trigger re-establishment during busy channel conditions, for example, causing a signaling storm. RLM may be enhanced to handle RLM-RS transmissions that may be subject to transmission uncertainty.

A WTRU may be configured to use a modified RLM process, RLM criteria, and/or set of RLM parameters for RLM. For example, an RLM process may be modified in order to differentiate bad channels from busy channels. A WTRU may detect a level of uncertainty and/or ambiguity that may exist when the WTRU processes measurement samples. A WTRU may influence (e.g., modify, adjust, or adapt) RLM based on, for example, a channel status. An RLM process may include processing, handling, and/or reacting to an ambiguous channel (e.g., a channel that may be busy, may be poor, or may be both). A WTRU behavior may be configured and/or controlled, e.g., when the WTRU is performing RLM in a shared spectrum.

As an example, determining whether a RLF has occurred and/or actions to take based on an RLF declaration may depend on whether the WTRU has detected a poor channel or a busy channel. For example, first RLM criteria (e.g., such as a number of consecutive out-of-sync conditions) may be used to determine RLF has occurred due to a poor channel. Second RLM criteria (e.g., such as a number of consecutive skipped RLM RS transmissions and/or a consecutive number of no-sync indications) may be used to determine RLF has occurred due to a busy channel. In some examples, declaring RLF based on a busy channel or based on a poor channel may result in the same actions being performed by the WTRU (e.g., the WTRU reacts in the same way to RLF declared based on busy channel as it would for a poor channel). In other example, the WTRU may react differently to an RLF declaration due to a busy channel than to an RLF declaration based on a poor channel.

A WTRU may use channel status information to influence (e.g., modify, adjust, or adapt) RLM. Deployments in an unlicensed spectrum may be characterized by sharing a frequency band. For example, two or more operators may share a frequency band and may or may not be coordinated. Two or more 3GPP (e.g. LTE/NR) and/or non-3GPP wireless systems (e.g. WiFi or radar) may share a frequency band, and may or may not be coordinated. A reference signal (e.g., one relevant to RLM) may not be transmitted when a channel is busy. A transmitted reference signal may be masked by an interfering transmission(s), for example, from a hidden node. Reference signal measurements may be ambiguous (e.g., referred as ambiguous channel). A WTRU may not be able to determine the nature of connectivity to a source cell, for example, in an ambiguous channel. For example, a channel(s) may be of ambiguous when a WTRU performs measurements but is unable to determine whether a channel has poor measurements because the channel is busy or because the channel itself is poor from the perspective of the WTRU. The channel may be busy if the channel could be of acceptable quality but is being used by another technology or source at the time of measurements. The channel itself may be poor from the perspective of the WTRU if the channel was not being used during the measurements but is still of a poor quality. Channel status information may be obtained and/or determined, for example, to determine the nature of connectivity to a source cell in an ambiguous channel.

A WTRU may use channel status information to influence one or more aspects of radio link monitoring. The channel status information may be obtained from, for example, LBT or CCA or other signaling from network. The WTRU may perform different actions in channels with different channel qualities (e.g., good, busy/ambiguous, or bad channel qualities), for example, based on a result of channel status aware RLM. The different channel qualities may include good, busy/ambiguous, or bad channel qualities. For example, the WTRU may not treat a busy and/or ambiguous channel at the same level of severity as a bad channel.

Implementations described herein may be applicable to functions (e.g., RLM, beam failure detection, and/or the like) involved in evaluating the connectivity to the network in a wireless system, for example LTE and/or NR.

A WTRU may be configured to determine a channel status. For example, the channel status may be based on a determination as to whether a transmission instance of RLM-RS was skipped or whether the RLM-RS was transmitted but the WTRU measures a poor channel based on the RLM-RS. A WTRU may differentiate bad channel from a busy channel or at least detect some level of uncertainty/ambiguity. For example, a channel status may correspond to a relative state of the channel (e.g., one or more of clear, busy, bad/poor etc.). A state of the channel may be relatively clear (e.g., high quality, low usage, etc.). A state of the channel may be relatively busy (e.g., frequent usage, good or bad quality when available, etc.). A state of the channel may be relatively bad/poor (e.g., low quality even when channel usage is low). The WTRU may evaluate the channel as to whether measurements correspond to a bad channel and/or a poor channel, for example, when processing measurement samples. The WTRU may identify a level of uncertainty and/or ambiguity as to whether measurements correspond to a bad channel and/or a poor channel, for example, when processing measurement samples. The WTRU may be configured to determine a channel status associated with a serving cell. The WTRU may use information about the channel status during RLM. The WTRU may determine that at least one transmission instance of RLM-RS was skipped. For example, the channel status information may implicitly or explicitly indicate whether a transmission instance of RLM-RS was skipped due to a busy channel. The channel status information may implicitly or explicitly indicate whether an interference (e.g., from a hidden node) is masking an RLM-RS transmission.

A received signal strength indicator(s) (RSSI(s)) may be measured and/or used to determine a channel status (e.g., whether a transmission instance of RLM-RS was skipped). A WTRU may be configured to perform Clear Channel Assessment (CCA) during RLM. For example, the WTRU may be configured to measure RSSI in a time window (e.g., a predefined time window). The WTRU may be configured to measure RSSI in symbols (e.g., symbols associated with a RLM-RS transmission(s)). A relatively high RSSI value may be indicative of an interference(s), e.g., from a non-serving node. For example, the WTRU may consider that the channel is busy or ambiguous if the downlink quality associated with the RLM-RS is below a threshold and/or the RSSI is above a threshold. The WTRU may determine that a transmission instance of RLM-RS was skipped based on a measurement of RSSI that is greater than the threshold.

A Zero-Power RS (ZP-RS) may be measured and/or used to determine a channel status (e.g., whether a transmission instance of RLM-RS was skipped). A WTRU may be configured with one or more ZP-RSs (e.g., ZP-RS configurations). The ZP-RS(s) may be associated with a resource(s) (e.g., correspond to resource elements) that a gNB blanks. The WTRU may expect a blank transmission(s) from a serving gNB in the resource(s). The WTRU may be configured to measure power in the resource(s) (e.g., resource elements) associated with the ZP-RS. The ZP-RS and a RLM-RS(s) may be configured in the same resources (e.g., symbols or subframes). For example, the ZP-RS and the RLM-RS(s) may be configured in the same resource block(s), sub-band(s), and/or BWP(s). A configured RLM-RS and a ZP-RS may be associated (e.g., linked). An association (e.g., a linkage) between the configured RLM-RS and the ZP-RS may be used, for example, to evaluate the interference associated with a specific resource. The non-zero power in a ZP-RS may be indicative of interferences (e.g., from a non-serving node). The WTRU may consider that the channel is busy or ambiguous if the received power in the ZP-RS is above a threshold. For example, a WTRU may measure a power on one or more resource elements configured to be blanked by a gNB. The WTRU may determine that a transmission instance of RLM-RS was skipped based on a measurement power on the resource elements that is above a threshold.

A WTRU may be configured to obtain further information about an interference source. For example, a WTRU may receive a configuration of one or more ZP-RS(s) that may be used to derive information regarding an interference source. For example, if a ZP-RS configuration is serving cell specific, then a detected and/or received power in the ZP-RS configuration (e.g., a ZP-RS in the ZP-RS configuration) may indicate non-serving cell interference. The ZP-RS(s) and/or ZP-RS configuration may be specific to cells belonging to the same operator and/or nodes that can be coordinated. If the ZP-RS is specific to cells belonging to the same operator (e.g., that can be coordinated), the detected and/or received power in ZP-RS may indicate uncoordinated interference. If the ZP-RS is specific to cells belonging to nodes that can be coordinated, the detected and/or received power in ZP-RS may indicate uncoordinated interference. The ZP-RS may be specific to 3GPP nodes. If the ZP-RS is specific to 3GPP nodes, the detected and/or received power in ZP-RS may indicate interference from a non-3GPP node(s) (e.g., a WiFi access point or radar).

Retroactive compensation may be used to determine a channel status (e.g., whether a transmission instance of RLM-RS was skipped). For example, the WTRU may receive a signal indicating that a previously expected RLM-RS was skipped. The WTRU may receive information indicating that a transmission instance of RLM-RS was skipped from a gNB. The WTRU may receive information at a time (e.g., T) about the status of one or more RLM-RS transmission instances in the past (e.g. T−n, T−2n etc.). For example, a gNB may skip a transmission(s) of one or more RLM-RS(s). The skipped transmission instance of RLM-RS may be due to LBT failure. A WTRU may receive the information (e.g., indication that indicates the skipped transmission instance of the RLM-RS) in a signaling. A WTRU may receive the information after the gNB reacquires the channel for transmission. The WTRU may determine that one or more RLM-RS transmissions in the past were skipped, for example, based on the information.

The WTRU may be configured to update an RLM criteria(ion)), RLM process(es), and/or set of RLM parameters (e.g., that is used to evaluate an RLF status of a cell) based on information indicating that a transmission instance of RLM-RS was skipped. The WTRU may be configured to update an RLM criteria, RLM process, and/or set of RLM parameters based on the information as described herein. In examples, the WTRU may perform RLM measurements on RLM-RS(s) that are transmitted on a cell. The cell may operate in an unlicensed spectrum. The WTRU may evaluate an RLF status for the cell, for example, using a RLM criteria. The WTRU may successfully measure the RLM-Rs(s) that are transmitted on the cell. The RLM criteria may correspond to an RLM process that uses a set of RLM parameters. In an example, the gNB may skip a transmission instance of RLM-RS (e.g., due to an LBT failure). In this example, if a retroactive compensation is not used, the WTRU may assume that the RLM-RS was transmitted and not received by the WTRU, thus generating an OOS indication. A retroactive compensation may be used to update an RLM criteria, RLM process, and/or set of RLM parameters. The WTRU may determine that a transmission instance of the RLM-RSs is skipped, for example, based on the information indicating that the transmission instance of RLM-RS was skipped (e.g., an indication). The WTRU may update the RLM criteria. The updated RLM criteria may correspond to an updated RLM process that uses an updated set of RLM parameters. For example, a first RLM criteria may be based on an N310 counter and/or T310 timer. The WTRU may evaluate an RLF status for a cell operating in an unlicensed spectrum using the first RLM criteria (e.g., where the N310 counter and/or T310 timer may be running). The WTRU may evaluate the RLF status for the cell operating in the unlicensed spectrum using a second RLM criteria, for example, where the N310 counter and T310 timer may be decremented (e.g., if running). The first criteria may include a first condition that requires a first number of consecutive OOS indications to declare RLF. The second RLM criteria may include a second condition requiring a second number of consecutive OOS indications to declare RLF. The second number of consecutive OOS indications may be greater than the first number of consecutive OOS indications.

Figure 2:
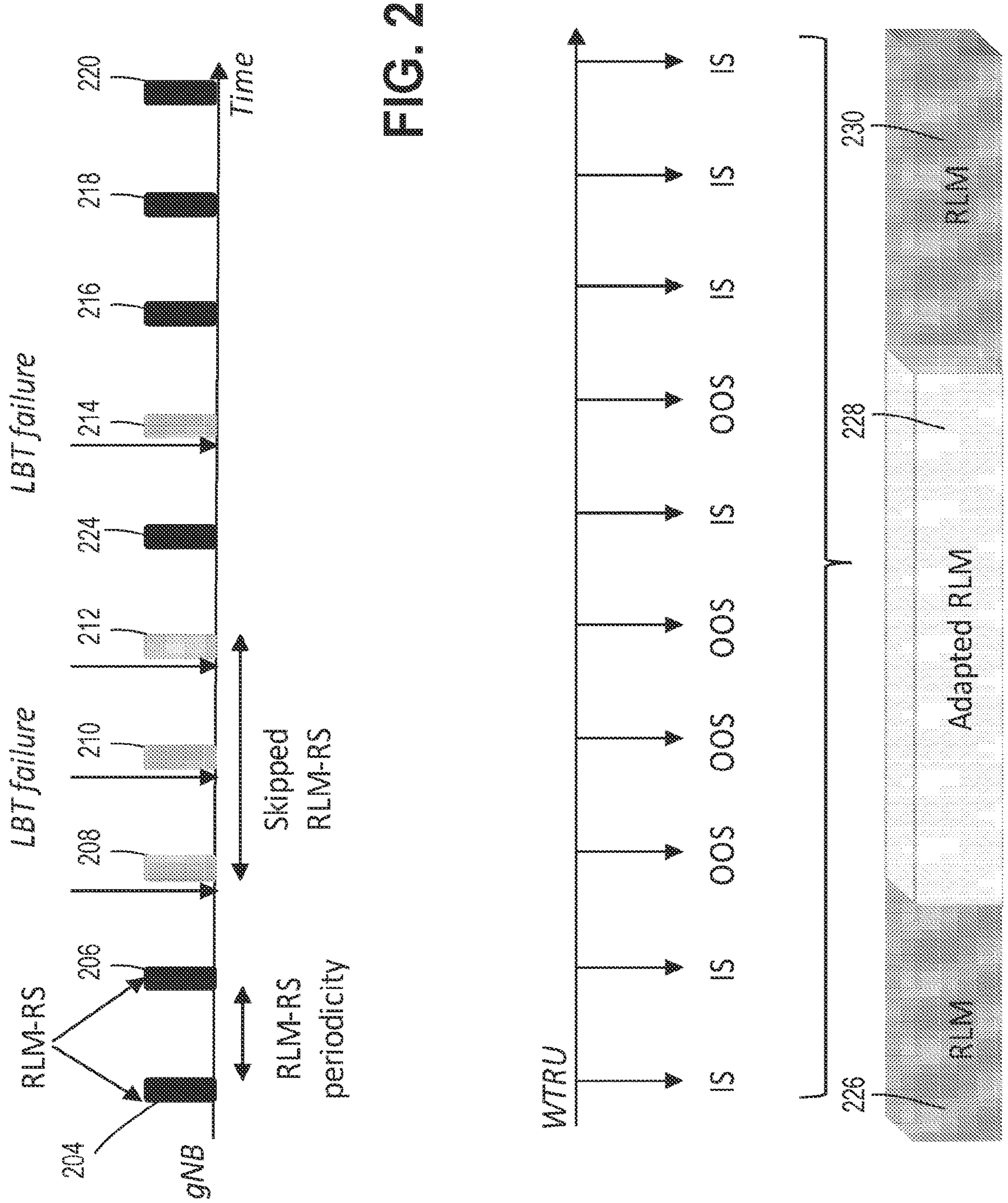
FIG. 2 illustrates an example of a WTRU using a modified RLM implementation.

FIG. 2 illustrates an example of a WTRU using a modified RLM implementation. In FIG. 2, a WTRU may use a modified or adapted RLM implementation based on a channel status. The modified or adapted RLM implementation may be performed based on a channel status. A gNB may periodically transmit an RLM-RS on a channel, for example at an RLM-RS periodicity. As shown in FIG. 2, the gNB may transmit RLM-RS 204 and RLM-RS 206. The WTRU may successfully receive RLM-RS 204 and RLM-RS 206. The WTRU may generate IS indications respectively when the WTRU successfully receives RLM-RS 204 and RLM-RS 206. The gNB may transmit the RLM-RS 204 and RLM-RS 206 at a periodicity. The periodicity may be shown by the distance between RLM-RS 204 and RLM-RS 206 in time domain. The channel may be an unlicensed channel. The gNB may perform LBT before transmitting an RLM-RS. The gNB may fail to transmit the RLM-RS if LBT fails. As shown in FIG. 2, the gNB may have an LBT failure and/or may skip a transmission of RLM-RS 208. The WTRU may determine that a transmission instance of RLM-RS was skipped and/or generate an OOS indication. The gNB may have an LBT failure and/or may skip a transmission of RLM-RS 210. The gNB may have an LBT failure and/or may skip a transmission of RLM-RS 212. The WTRU may determine that the transmission instances of RLM-RS 210 and 212 were skipped and/or generate corresponding OOS indications. Next, the gNB does not have an LBT failure and/or may transmit RLM-RS 224. The WTRU may successfully receive RLM-RS 224 and generate a corresponding IS indication. The gNB may have an LBT failure and/or may skip a transmission of RLM-RS 214. The WTRU may determine that a transmission instance of RLM-RS was skipped and/or generate a corresponding OOS indication. Next, the gNB may not have an LBT failure and/or may transmit RLM-RSs 216-220. The WTRU may successfully receive RLM-RSs 216-220 and generate corresponding IS indications.

A WTRU may perform RLM using an RLM criteria, an RLM process, or a set of RLM parameters. For example, the RLM parameters may include timers/counters, sync indications, etc. The WTRU may fail to receive the RLM-RS because, for example, LBT has failed (e.g., as shown in FIG. 2), or due to interference from a hidden node. If the WTRU fails to receive the RLM-RS, the WTRU may use an adapted or modified RLM criteria, RLM process or set of RLM parameters. As shown in FIG. 2, the WTRU may use a first set of RLM criteria 226 when the WTRU receives RLM-RSs 204 and 206. The WTRU may adapt the RLM criteria or RLM process (e.g., use a second RLM criteria or RLM process 228) if the WTRU determines a skipped RLM-RS 208. For example, the WTRU may modify the RLM process by changing RLM counters/timers as a function of channel occupancy, modifying IN/OUT sync counting, applying a historical BLER value with a decay factor, etc. The WTRU may modify IN/OUT sync counting by introducing a No-Sync indication or fractionally incrementing an OOS counter when WTRU determines that the RLM-RS is skipped. The WTRU may use the RLM criteria and/or RLM process that the WTRU uses before the WTRU makes the adaptation/modification, for example, if the WTRU successfully receives an RLM-RS(s). As shown in FIG. 2, the WTRU may use RLM criteria or RLM process 230 if the WTRU determines that the WTRU successfully receives one or more RLM-RSs (e.g., RLM-RS 224). The RLM criteria or RLM process 230 may be the same as the first RLM criteria or first RLM process 226.

Figure 3:
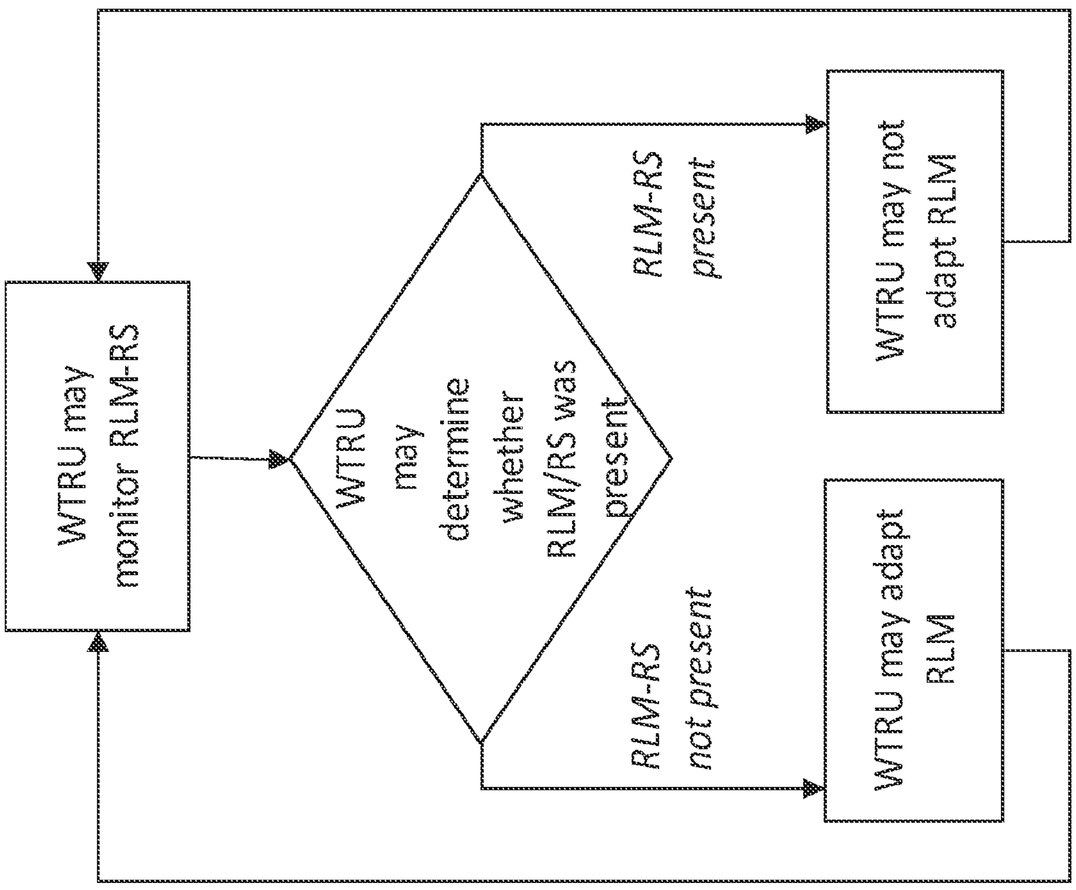
FIG. 3 illustrates an example flowchart that may be part of an RLM implementation.

FIG. 3 illustrates an example flowchart that may be part of an RLM implementation. A WTRU may monitor a channel for an RLM-RS. For example, the WTRU may evaluate an RLF status based on successfully measuring RLM-RSs. The channel may be an unlicensed channel. The WTRU may determine whether an RLM-RS was present (e.g., within a time window). If the RLM-RS was present, the WTRU may use an RLM implementation and continue to monitor for an RLM-RS on the channel. If the RLM-RS was not present, the WTRU may adapt or modify the RLM implementation and/or perform RLM using the adapted or modified RLM implementation. The WTRU may return to the RLM implementation, for example, upon receipt of the RLM-RS. The RLM implementation may include one or more of a RLM criteria, RLM process, or a set of RLM parameters.

The WTRU may receive information indicating that a transmission instance of RLM-RS was skipped via signaling. The signaling may not specify a RLM-RS periodicity or resource (e.g., may be generic). For example, the signaling may indicate whether the gNB was transmitting or not during a time (e.g., predefined time periods). The signaling may include (e.g., be expressed as) a bitmap at the granularity of slots, subframes, and/or frames. The WTRU may determine (e.g., compute) a status of an RLM-RS transmission instance based on, for example, RLM-RS periodicity and/or resource mapping.

The WTRU may receive the signaling of the information indicating that a transmission instance of RLM-RS was skipped via broadcast signaling or a dedicated message. In an example, a WTRU may receive signaling about an RLM-RS transmission status (e.g., whether a transmission instance of RLM-RS was skipped) in a broadcast signaling. The broadcast signaling may be sent using a SIB or MIB. For example, the WTRU may receive the RLM-RS transmission status in a DCI (e.g. using a RNTI predefined for the indication of the RLM-RS transmission status). The WTRU may receive the signaling, for example, in a group common PDCCH. The signaling may be implicit (e.g., implicitly encoded in a slot format indicator (SFI)). The WTRU may receive the signaling about the RLM-RS transmission status associated with a secondary node. The WTRU may receive the signaling about the RLM-RS transmission status associated with the secondary node in a dedicated RRC message or broadcast signaling (e.g. SIB). The WTRU may receive dedicated RRC message or broadcast signaling, for example from a master node. The master node may be in a licensed spectrum.

A WTRU may be configured to determine that a transmission instance of RLM-RS was skipped based on a characteristic associated with the RLM-RS transmission instance. The WTRU may perform sequence-based detection of a missing RLM-RS. A WTRU may be configured to determine that a transmission instance of RLM-RS was skipped based on failing to detect a characteristic associated with the RLM-RS transmission instance (e.g., during the transmission instance associated with the RLM-RS). For example, a WTRU may be configured to determine the status of an RLM-RS transmitted in the past (e.g. at time T−n) implicitly based on a characteristic associated with the RLM-RS transmission in the future (e.g. at time T).

The characteristic associated with the RLM-RS transmission instance may be a scrambling ID. The scrambling ID may be associated with an initial value of a pseudo-random sequence generator. For example, the WTRU may be configured with a set (e.g., an ordered set) of N scrambling IDs for a given RLM-RS. A transmission (e.g., each transmission) of the RLM-RS may be scrambled by selecting one scrambling ID from a preconfigured set of scrambling IDs (e.g., from the ordered set of N scrambling IDs). Selection of the scrambling IDs may be cyclic for subsequent transmissions (e.g., each subsequent transmission) of the RLM-RS. In an example, a first transmission of the RLM-RS may be scrambled by selecting a first scrambling ID or may be skipped. A transmission subsequent to the first transmission may use the same first scrambling ID, e.g., if the first transmission of the RLM-RS is skipped. The first transmission of the RLM-RS may be skipped due to LBT failure (e.g., of a gNB). The WTRU may determine if and/or how many (e.g. up to N−1) RLM-RS transmission instances were skipped, for example, based on the scrambling ID associated with a transmission instance of the RLM-RS. The WTRU may calculate the difference between a hypothetical scrambling ID and the actual scrambling ID. For example, a hypothetical scrambling ID may be a scrambling ID that would have been used if transmission of all the previous RLM-RS(s) were successful. The cycling of the scrambling ID may be reset, for example, to further synchronize the scrambling ID usage. The cycling of the scrambling ID may be reset, for example, at a predetermined periodicity (e.g. a cycling periodicity). The cycling of the scrambling ID may be reset, for example, by starting from the first ID within the ordered set.

The characteristic associated with the RLM-RS transmission instance may be resource mapping (e.g., a cyclic shift). For example, the WTRU may be configured with a cyclic shift that may be used to determine the time and/or frequency domain mapping of an RLM-RS (e.g., an RLM-RS sequence). Transmissions (e.g., each transmission) of the RLM-RS may use a specific resource mapping. A subsequent RLM-RS transmission(s) may be shifted in time and/or frequency, for example, using a predefined offset. For example, a transmission instance of a RLM-RS may use a first resource mapping (e.g., based on a first cyclic shift from a starting or a reference time/frequency resource). A subsequent transmission instance of the RLM-RS may use a second resource mapping (e.g., based on a second cyclic shift). The second resource mapping may be shifted by a predefined offset in time and/or frequency from the first resource mapping. The second resource mapping may not be shifted by the predefined offset in time and/or frequency from the first resource mapping, e.g., if the transmission instance of the RLM-RS is skipped. The WTRU may determine if and/or how many (e.g., up to N−1) RLM-RS transmission instances were skipped, e.g., based on the cyclic shift associated with a transmission instance of the RLM-RS. The WTRU may calculate the difference between a hypothetical cyclic shift and the actual cyclic shift. For example, the hypothetical cyclic shift may be a cyclic shift that would have been used if all the previous RLM-RS were successful. Resource mapping may be reset, for example, to further synchronize the cyclic shift. Resource mapping may be reset at a predetermined periodicity (e.g. a cycling periodicity). Resource mapping may be reset to start from a predefined resource mapping.

Proactive compensation may be used to determine a channel status (e.g., whether a transmission instance of RLM-RS was skipped). A WTRU may receive information (e.g., at time T) about the status of one or more transmission instances of an RLM-RS in the future (e.g., T+n, T+2n etc.). In an example, a gNB may be close to exceeding a maximum channel occupancy time. The gNB may evacuate the channel, for example, to meet regulatory requirements. One or more transmission instances of the RLM-RS may be skipped. The WTRU may learn about an upcoming absence of a transmission(s) of the RLM-RS, for example, based on signaling from network. The WTRU may be configured to consider what the WTRU learns, for example, as an input. The WTRU may be configured to update an RLM process, RLM criteria, and/or set of RLM parameters (e.g., as a proactive compensation) for an upcoming RLM evaluation period.

The WTRU may learn about an upcoming absence of a transmission(s) of the RLM-RS explicitly or implicitly. For example, the signaling about the upcoming absence of the transmission(s) of the RLM-RS may be in a DCI (e.g., with a predefined RNTI). The signaling may be, for example, in a group common PDCCH. The signaling may be implicitly encoded in an SFI. The information about the upcoming absence of the transmission(s) of the RLM-RS may be signaled in a broadcast message. The information may be provided implicitly, for example, using a predefined sequence. The predefined sequence may indicate the end of a transmission burst. The WTRU may determine (e.g., derive) the information about the upcoming absence of the transmission(s) of the RLM-RS based on the starting time of a gNB transmission burst and/or maximum channel occupancy time. The WTRU may calculate the starting time of a gNB transmission burst in relation to detecting a predefined sequence (e.g., in a reference time/frequency resource). If the WTRU determines (e.g., upon determining) one or more upcoming RLM-RS is skipped, the WTRU may be configured to update an RLM process, RLM criteria, and/or set of RLM parameters (e.g., perform channel status aware RLM as described herein).

Eavesdropping may be used to determine a channel status (e.g., whether a transmission instance of RLM-RS was skipped). A WTRU may determine a channel status based on eavesdropping transmissions, for example, from a non-3GPP air interface. For example, a WiFi capable WTRU connected to a 3GPP network may determine the status of a shared spectrum based on WiFi transmissions. One or more transmissions from WiFi may enable the WTRU to determine if the channel may be occupied by non-3GPP interface. Examples of transmissions from WiFi may include Ready to Send (RTS)/Clear to Send (CTS) frames and/or virtual carrier sensing using Network Allocation Vector (NAV). The WTRU may determine how long the transmissions from WiFi may last. The WTRU may determine whether or not the transmissions from WiFi may overlap with a potential transmission instance of a RLM-RS on the 3GPP interface. The WTRU may use the information to update an RLM process, RLM criteria, and/or set of RLM parameters (e.g., perform channel status aware RLM as described herein).

A WTRU may be configured to use signal detection to determine a channel status (e.g., whether a transmission instance of RLM-RS was skipped). In an example, a WTRU may determine the channel status based on detection of a wake-up signal and/or a preamble signal. The preamble signal may indicate the beginning of a COT. The WTRU may decode the signal (e.g., the preamble signal or a wakeup signal) and/or may determine the public land mobile network (PLMN) and/or the physical cell identity (PCI) of the transmitter. The WTRU may determine whether the signal indicates that the WTRU's serving or neighboring cell has occupied the channel, for example, based on the PLMN and/or the PCI. If the signal contains an indication of a COT structure (e.g., SFI), the WTRU may determine the channel status for the indicated period of time. The WTRU may determine the channel status of an (e.g., each) sub-band within a DL BWP separately.

An RLM process, RLM criteria, and/or set of RLM parameters may be updated to process, handle, and/or react to an ambiguous channel. A WTRU may be configured to monitor downlink quality based on RLM-RS measurement samples over a predefined time period, for example, as a part of RLM. The predefined time period may correspond to an evaluation period. The evaluation period may be a function of one or more of the following: type of RLM-RS(s), periodicity of the RLM-RS(s), type of indication(s) (e.g., an IS or OOS indication(s)), DRX configuration, or the like. The WTRU may be configured to compare an estimated downlink quality against thresholds (e.g., Qin and/or Qout). The WTRU may be configured to generate an IS/OOS indication based on the comparison. The WTRU may be configured to send an IS/OOS indication to higher layers (e.g., RRC). A higher layer filter (e.g., layer 3 filter) may be applied to the IS/OOS indications. The higher layer filter may have preconfigured coefficients. Two successive indications from lower layer(s) may be separated, for example, by at least a time interval. The time interval may be predefined. The time interval may correspond to an indication interval. The indication interval may be a function of one or more of the following: type of RLM-RS(s), periodicity of the RLM-RS(s), type of indication(s) (an IS or OOS indication(s)), DRX configuration, or the like.

Measurement samples may be selected and/or scaled, for example, as a function of channel status. A WTRU may be configured to receive RLM-RS(s) within a time window configured using, for example, RLM-RS Measurement Timing Configuration (RMTC). Being configured to receive RLM-RS(s) within a time window may account for timing uncertainty (e.g., due to LBT). The RMTC may correspond to SS Block based Measurement Timing Configuration (SMTC), for example, if SSB is used as RLM-RS. The RMTC configuration may include one or more of periodicity, offset, and duration. The RMTC configuration may be expressed as a number of subframes. For example, the WTRU may expect RLM-RS in any symbol within the time window (e.g., defined by the RMTC).

Measurement samples may be selected and/or scaled during an evaluation period. A WTRU may be configured with an evaluation period. The evaluation period may be a multiple of RLM-RS periodicity or the periodicity of RMTC (e.g., in case of RMTC). The RLM-RS may be transmitted multiple times, for example, within the evaluation period. The measurement samples within the evaluation period may fluctuate due to, for example, channel ambiguity. The fluctuation may be rapid. The WTRU may be configured to derive channel quality based on, for example, at least n number of measurement samples that are unambiguous. The value of n may be configured, e.g., preconfigured to be a function of at least RLM-RS periodicity, type of indication IS/OOS, DRX configuration, or the like.

A WTRU may be configured to adjust and/or scale higher layer coefficients, for example, based on a channel status determination. For example, the WTRU may apply less weight for measurement samples collected when the channel state is ambiguous. The WTRU may adjust the higher layer coefficients based on the nature of interference. For example, different weights may be used for 3GPP vs. non-3GPP interference. Different weights may be used for coordinated vs. uncoordinated interference. The WTRU may be configured to determine the probability of detecting a (e.g., each) RLM-RS sample(s) within the evaluation period. The WTRU may adjust the weight of a layer 3 filter based on the probability of detecting the RLM-RS sample(s).

A WTRU may be configured to select a preconfigured number of measurement samples, for example, from a group of measurement samples. The WTRU may disregard samples which are outliers, for example, based on, a preconfigured offset if the WTRU is configured to select a preconfigured number of measurement samples from a group of measurement samples. The offset (e.g., preconfigured) may be BWP specific and/or may be received in a BWP configuration. The number of measurement samples (e.g., preconfigured) may be BWP specific and/or may be received in a BWP configuration.

Channel quality may be determined by using a fallback to predefined downlink signals. A WTRU may be configured to use one or more predefined downlink signals for RLM, for example, when an RLM-RS is not detected within an RMTC window. A WTRU may be configured to use one or more predefined downlink signals for RLM, for example, when more than a preconfigured number of measurement samples are ambiguous within an evaluation period. The WTRU may determine channel quality based on a RS(s) that is not explicitly configured for RLM. For example, the RS(s) may include a beam management RS, CSI-RS configured for CSI reporting, and/or SSB if only CSI-RS is configured for RLM. The RS may be quasi-collocated (QCLed) with at least one preconfigured RLM-RS. The WTRU may determine the channel quality based on a successful reception of DCI related to a broadcast transmission (e.g. SI-RNTI in a common search space). For example, the WTRU may generate an IS indication if a preconfigured number of DCIs are successfully decoded within a time period. The time period may include an indication interval or evaluation interval. An OOS indication may be generated if a preconfigured number of DCIs are not successfully decoded within the time period. The WTRU may monitor for an RLM-RS(s) and/or predefined downlink signals within the RMTC window. The WTRU may monitor for the RLM-RS(s) within the RMTC window and fallback to monitoring predefined downlink signals outside the RMTC window. The WTRU may monitor the predefined downlink signals outside the RMTC window until the next RMTC window or a condition to generate an IS/OOS indication(s) is satisfied (e.g., whichever is earlier).

A WTRU may be configured with a plurality (e.g., X number) of RLM-RSs for RLM. An RLM-RS (e.g. each RLM-RS) may be associated with a transmission beam. The WTRU may determine whether to generate IS, OOS, or NS based on, for example, a channel status in the plurality of RLM-RS(s). For example, if more than n RLM-RS results are ambiguous, the WTRU may be configured to generate an NS(s). If the number of RLM-RS with ambiguous results is more than a number of RLM-RS with an OOS(s), the WTRU may generate an NS(s).

The WTRU may be configured to select n RLM-RS(s) out of X configured RLM-RSs for an RLM evaluation, based on, for example, the channel status (e.g., determination of whether a RLM-RS is skipped or not) associated with the RLM-RS(s). For example, the WTRU may be configured to perform an RLM evaluation based on a CSI-RS resource QCLed with SSB, for example, when the WTRU determines that the SSB transmission is skipped (e.g., due to LBT).

A block error rate (BLER) may be determined during an ambiguous channel. A WTRU may be configured to determine the BLER during an ambiguous channel condition based on, for example, a previous BLER value(s) associated with the channel. For example, the WTRU may compute (e.g., calculate) the BLER based on a weighted average of the previous n BLER values of the channel. The WTRU may add a preconfigured negative offset to the averaged BLER value. For example, the negative offset may be incremented during indication intervals (e.g., each indication interval). The incrementation of the negative offset may be additive increase and/or multiplicative increase. The negative offset may be a function of, for example, one or more of a number of unambiguous measurement samples collected during an evaluation period, an RLM-RS measurement result, one or more channel measurements (e.g., a level of interference), a number of missed transmission opportunities, one or more sources of interference (e.g. different values for 3GPP vs non-3GPP interference), or the like. The negative offset may be reset to an initial value when an IS indication is received. The WTRU may be configured to generate an IS/OOS/NS indication(s) based on, for example, comparing the computed BLER value with the Qin/Qout threshold.

An indication associated with an ambiguous channel (e.g., a No-Sync (NS)) may be generated. A WTRU may be configured to generate an indication (e.g., NS indication) that is different from an IS and OOS indication(s). The WTRU may be configured to generate the indication to inform higher layers of an ambiguous channel condition (e.g., during an RLM process). For example, an NS indication may be generated when the channel status is determined to be ambiguous using one or more examples described herein (e.g., when an RLM-RS is determined not to be received). The NS indication may be generated when lower layers may not conclusively determine the channel quality, for example, due to the absence of RLM-RS transmission(s). The NS indication may be generated when lower layers may not conclusively determine the channel quality, e.g. due to the masking of RLM-RS in a busy channel.

The WTRU may be configured to track a number of NS indications that the WTRU received from lower layers. For example, the WTRU may maintain an NS counter of a number of (e.g., consecutive) NS indications. The NS counter may include N312 or NS310. The WTRU may be configured to reset the NS counter, for example, upon receiving an IS indication. The WTRU may be configured not to reset the NS counter, for example, upon receiving an OOS indication. The WTRU may be configured to perform a predefined action, for example, when the NS counter reaches a preconfigured maximum value. Consecutive NS indications may indicate that the channel has been busy for a period (e.g., relatively long period) of time. For example, the channel may have been busy for a period of time due to a relatively high density of competing nodes and/or relatively high channel load that results in failed transmissions. The WTRU may start a timer (e.g., T310) if the timer is not already running. The WTRU may trigger an RLF when a timer (e.g., T310) is running and the NS counter reaches a maximum value. The WTRU may start a timer (e.g., T310) when the sum of the OOS counter and the NS counter reaches a maximum value. The WTRU may exclude the time interval from a timer when an NS indication is received. For example, the WTRU may exclude the time interval from T310 when an NS indication is received, when T310 is running. The WTRU may pause the timer (e.g., T310) when an NS indication is received. The WTRU may interpret an NS indication based on the status of the timer (e.g., T310). For example, the WTRU may treat an NS indication as an IS indication when T310 is running. The WTRU may treat an NS indication as an OOS indication when T310 is not running.

The WTRU may be configured to interpret an NS indication differently based on previous indications. In examples, the WTRU may be configured to interpret the NS indication based on, for example, previous indications from the lower layers. For example, if the number of OOS indications out of 'n' previous indications from lower layers is above a number (e.g., preconfigured number), the WTRU may interpret the NS indication as an OOS indication. If the number of IS indications out of 'n' previous indications from lower layers is above a number (e.g., preconfigured number), the WTRU may interpret the NS indication as an IS indication. If the number of NS indications out of 'n' previous indications from lower layers is above a number (e.g., preconfigured number), the WTRU may start a timer. If an IS/OOS indication is not received before the expiration of the timer, the WTRU may be configured to either start T310 timer or trigger RLF (e.g., if T310 is already running).

A counter (e.g., an OOS counter) may be incremented by a fractional value. For example, a WTRU may be configured to increment an OOS counter by a fractional value (e.g., increment less than 1) during an ambiguous channel condition. The WTRU may be configured (e.g., preconfigured) with a fractional value. The WTRU may receive a fractional value in an RRC signal or via system information broadcast. The WTRU may determine the fractional value based on, for example, one or more of an RLM-RS measurement result, one or more channel measurements (e.g., level of interference), a number of missed transmission opportunities, a source of interference (e.g. different values for 3GPP vs non-3GPP interference), or the like. The WTRU may be configured to use a fractional increment (e.g., increment an OOS counter by a fractional value) when an NS indication is received. The WTRU may be configured to use a fractional increment (e.g., increment an OOS counter by a fractional value) when an OOS indication is received and the channel status is determined to be ambiguous (e.g., using one or more examples described herein).

A WTRU may be configured to use zero power resources for RLM (e.g., evaluation). For example, a zero power resource may be a time/frequency resource on which the network node does not transmit a signal (e.g., is blanked). A CSI-IM (e.g., that may also be referred to as an RLM-IM) may be an example of a zero power resource. A WTRU may be configured with RLM channel state information interference management (CSI-IM) resources in a DL BWP, for example in addition to an RLM-RS(s), for RLM. The WTRU may be configured with RLM CSI-IM resources in a (e.g., each) DL BWP. The WTRU may monitor the CSI-IM resources in an active DL BWP. The WTRU may evaluate the level of interference experienced in the active DL BWP based on the monitoring of the CSI-IM resources. The CSI-IM resources may be configured on the same resources (e.g., RBs) as the RLM-RS(s). The WTRU may perform L1 measurements on ZP and/or non-ZP resources. The WTRU may keep a counter for different types (e.g., each type) of resources. For example, the WTRU may keep a counter for each of the ZP resource(s) and of the non-ZP resource(s).

In an example, the WTRU may generate and/or send (e.g., to higher layers) an indication based on the evaluation of the interference level on CSI-IM resources. The WTRU may send the indication in addition to an IS indication(s) and an OOS indication(s). For example, the indication may be an unknown sync (US) indication. The higher layers may restart an RLF timer if the higher layers receive multiple (e.g., upon reception of N) US indications. The WTRU may be configured with a threshold associated with the US indication (e.g., an US-specific counter threshold). The WTRU may declare RLF if the threshold is reached (e.g., upon reaching the US-specific counter threshold).

In an example, the WTRU may indicate IS and/or OOS indications to higher layers. For example, the WTRU may only send a legacy IS-OOS (e.g., may not use the US indication). The OOS indication may be generated and/or sent based on (e.g., subject to) the measurement results on CSI-IM resources. The WTRU may be configured to refrain from sending an OOS indication if a measurement result(s) on CSI-IM resources is above a threshold. In examples, the CSI-IM measurement being above a threshold may indicate a LBT failure and/or may not indicate poor channel conditions. The WTRU may send the IS, skip the indication, and/or transmit an NS indication. As an example, the WTRU may send the IS, skip the indication, and/or transmit a non-sync indication without taking into account the CSI-IM measurement result. For example, the WTRU may send the IS, skip the indication, and/or transmit an NS indication without taking into account the CSI-IM measurement result if the measurement of the RLM-RS meets the criteria for IS, skipping the indication, and/or transmitting an NS indication. In an example, the OOS indication may be conditioned on a CSI-IM measurement. Whether to send IS, skip the indication, and/or transmit an NS indication may not be conditioned on a CSI-IM measurement.

A WTRU may be configured to receive a configuration of RLM-RS per sub-band (e.g., for a configured DL BWP). For example, a configuration of RLM-RS per sub-band may be received for each configured DL BWP. The WTRU may determine which RLM-RS to monitor for RLM, for example, based on RSSI and/or channel occupancy (CO) measurements on a corresponding sub-band (e.g., a sub-band that corresponds to a received configuration of RLM-RS(s)). For example, if an RSSI or CO measurement result in a given sub-band of an active DL BWP is higher than a configured threshold, the WTRU may not consider the configured RLM-RS resources within the sub-band for RLM. The WTRU may perform RLM evaluation on low-loaded sub-bands. The RSSI or CO measurement result may be lower than the configured threshold on low-loaded sub-bands. The WTRU may be configured to refrain from performing RLM on sub-bands that are indicated as busy or loaded, for example, based on the RSSI or CO measurement result.

In an example, if the contention metric in one or more sub-bands in an active DL BWP is higher than a threshold, the WTRU may activate pre-configured RLM-RS resources in other sub-bands of the active DL BWP. For example, the WTRU may activate the pre-configured RLM-RS resources when the contention metric in each of the sub-bands currently being measured is higher than a threshold.

In an example, the WTRU may maintain multiple RLM loops. As used herein, a loop may refer to an RLM process (e.g., an independent RLM process) with one or more associated RLM resources, Qin-Qout thresholds, timers and/or counters. For example, the WTRU may maintain one RLM loop per sub-band. The WTRU may trigger RLF when one or more sub-bands of the active DL BWP reach an RLF criteria (e.g., N OOS indications in each sub-band). For example, an RLF may be triggered when all sub-bands of the active DL BWP reach the RLF criteria.

A WTRU may be configured to use aperiodic or semi-persistent CSI-RS resources for RLM. Aperiodic or semi-persistent CSI-RS transmissions may be used for RLM to deal with the uncertainty of periodic CSI-RS transmissions due to LBT. Periodic CSI-RS transmissions may be uncertain, for example, due to LBT. The uncertainty may be dealt with, for example, using aperiodic or semi-persistent CSI-RS transmissions for RLM. The WTRU may be pre-configured with multiple CSI-RS resources, for example, in different sub-bands. The WTRU may expect to receive a MAC CE or DCI. The WTRU may activate/deactivate a set of CSI-RS(s) based on an LBT result in the corresponding sub-band of the active DL BWP and/or the received MAC CE or DCI. For example, the WTRU may use one or more aperiodic or semi-persistent CSI-RS resources for RLM when the channel load on the active DL BWP exceeds a certain level (e.g., indicating that the configured periodic RLM-RS(s) is uncertain). If the WTRU does not receive a MAC CE or DCI (e.g., due to bad channel conditions) within a time window (e.g., a preconfigured time window), the WTRU may send an OS indication to higher layers for the time window. The preconfigured time window may be, for example, an RLM evaluation period.

The WTRU may receive a DCI for an aperiodic CSI-RS transmission(s) (e.g., when the channel is acquired by the gNB). The WTRU may receive an indication that the WTRU may perform RLM on indicated RSs (e.g., the aperiodic CSI-RS transmission(s)). The WTRU may receive the indication in the DCI. The DCI may be WTRU-specific or common to multiple WTRUs configured with a DL BWP containing the transmitted aperiodic CSI-RS resource. For example, the DL BWP may be an active DL BWP.

A WTRU may be configured to perform channel status aware RLM based on a status of a timer, (e.g., T310). A WTRU may be configured to perform one or more of the examples described herein, for example, as a function of the status of a timer related to RLF (e.g., T310). For example, the WTRU may be configured to perform legacy RLM when T310 is not running. The WTRU may switch to channel status aware RLM when T310 is running. The WTRU may determine an increment value for an IS counter, for example, based on the status of timer T310. In an example, a first increment value may be used when T310 is running (e.g., less than 1), and a second increment value may be used when T310 is not running (e.g., 1).

A WTRU may be configured to perform autonomous UL triggering of a signal related to RLM and/or RLM-RS reception in a portion of a UL grant that is relinquished by a WTRU. A WTRU may be configured to relinquish a whole or parts of a UL grant, based on, for example, a status of an RLM-RS transmission in the past. The UL grant may be dynamically or semi-statically configured for the WTRU. The WTRU may autonomously acquire the channel, for example, after a full LBT. For example, the WTRU may have failed to receive one or more RLM-RS(s) in a previous time period. The WTRU RLM counter (e.g., N310 or NS counter) may reach a condition (e.g., a critical condition including a preconfigured critical condition). The WTRU RLM timer (e.g. T310) may reach a condition (e.g., a critical condition including a preconfigured critical condition). Upon one or more of triggers (e.g., as described herein), the WTRU may transmit an indication in the UL indicating that RLM-RS was not received reliably in a previous time period, and/or may relinquish the UL grant. The triggers may include the WTRU's failure to receive one or more RLM-RS(s) in a previous time period, or that the WTRU RLM counter or RLM timer reaches a condition (e.g., a critical condition). The network may use the channel to transmit an RLM-RS(s) and/or a signal similar to an RLM-RS(s). The WTRU may be configured to monitor for an RLM-RS signal in the remaining portion of the UL grant. The WTRU may indicate to the network the portion of the transmission opportunity where the RLM-RS may be transmitted. For example, the WTRU may transmit an autonomous uplink (AUL)-UCI to indicate to the network the portion of the transmission opportunity. The WTRU may transmit a bitmap of most recently received RLM-RS (e.g., in an AUL).

A WTRU may be configured to adapt one or more counters and/or timers, for example, based on channel occupancy. The counters and/or timers may be used as part of an RLM process. A WTRU (e.g., that is performing RLM) may apply a set of counters and timers based on current, past, and/or observed channel occupancy. The timers (e.g., N310, N311, and/or T310) may depend on current, past, and/or observed channel occupancy. For example, RLM parameters may be set such that T310 has a longer duration for higher channel occupancy and a lower duration for lower channel occupancy. Using a different set of RLM parameters and/or a different RLM process may be use to avoid premature declaration of RLF (e.g., due to failure of a network to provide an RLM-RS under high channel load).

Higher layers (e.g., RRC) may configure one or more RLM parameter(s) with more than one value. An RLM parameter may include at least one of the N310 and N311 counters and the T310 timer. For example, T310 may be configured with two possible values. A WTRU may determine the applicable value of the one or more RLM parameter(s) based on a metric or an indication (for example, as described herein). The WTRU may (e.g., based on the indication) multiply a value of an RLM parameter by a factor. For example, the WTRU may double the length of the T310 timer by applying a factor of 2 to the T310 timer. The factor may be pre-defined and/or configured. For example, a multiplicative factor may be applied upon determining that the channel is considered busy or occupied.

A metric may be determined (e.g., defined). The metric may correspond to an estimation and/or a measurement of the channel occupancy. For example, a channel occupancy metric including a percentage of samples for which RSSI is above a threshold may be used. The WTRU may be configured with at least one threshold for the metric. The WTRU may apply the value of the one or more RLM parameter(s) as a function of the value of the metric compared to the at least one threshold. For example, a single channel occupancy threshold may be configured, for example, along with two values of T310. The WTRU may apply a first value if the channel occupancy is below the threshold and a second value if the channel occupancy is above the threshold. The at least one threshold may be pre-defined or configured by higher layers. The at least one threshold may be the same as the threshold used for triggering a measurement report of the channel occupancy.

A WTRU may determine the applicable value of the one or more RLM parameter(s) based on a dynamic indication from the network. The indication may be received via a MAC CE. The indication may be received via PDCCH that is received from a common search space or WTRU-specific search space. For example, the indication may be provided in a common DCI (e.g., the same DCI that contains SFI). The indication may be provided in a DCI (e.g., the same DCI) that contains a presence indication. The indication may be provided in a separate DCI. The information may include (e.g., consist of) an index to the applicable value. The information may include a channel occupancy measurement (e.g., taken by the network). The WTRU may determine the applicable value based on one or more of the indicated channel occupancy (from PDCCH), the measured channel occupancy, or at least one threshold. As an example, the WTRU may determine the applicable value based on the indicated channel occupancy (e.g., from PDCCH) and at least one threshold. The WTRU may determine the applicable value based on the measured channel occupancy and at least one threshold. For example, the WTRU may determine the applicable value based on whether the maximum of the two channel occupancies (e.g., the indicated channel occupancy and the measured channel occupancy) is above a threshold.

The WTRU may determine the applicable value of the one or more RLM parameter(s) based on a property of RLM-RS. For example, the property of RLM-RS may include a scrambling ID. The WTRU may attempt to detect an RLM-RS using at least one property. The WTRU may determine the value of the at least one property based on the highest likelihood (e.g., the highest correlation). For example, the WTRU may apply a first value of T310 if an RLM-RS is detected with a first scrambling ID. The WTRU may apply a second value of T310 if the RLM-RS is detected with a second scrambling ID. The values for the at least one property may be configured, for example, by higher layers.

The WTRU may be configured with two or more RLM-RS resources. The resources (e.g., each resource) may be associated with respective values of the RLM parameters. The WTRU may perform RLM independently on a RLM-RS resource(s) (e.g., each RLM-RS resource). The WTRU may declare RLF when the T310 timer has expired for RLM-RS resources, and the channel quality has not recovered since T310 has last expired for resources. For example, the WTRU may declare RLF only when the T310 timer has expired for all RLM-RS resources, and the channel quality has not recovered since T310 has last expired for resources (e.g., each resource). The WTRU may determine that the channel quality has not recovered based on receiving at least one N311 in-sync indication(s). The network may select the RLM-RS resource, for example, as a function of a channel occupancy. The network may select the RLM-RS resource, for example, as a function of how frequently the RLM-RS is transmitted due to failure of accessing the channel.

The WTRU may start monitoring for a second RLM-RS resource, for example, when T310 is running for a first RLM-RS resource. For example, the WTRU may start monitoring for the second RLM-RS resource only when T310 is running for the first RLM-RS resource. The first RLM-RS and the second RLM-RS may be configured with different periodicities. If the first RLM-RS and the second RLM-RS are configured with different periodicities, the WTRU may monitor the RLM-RS configured with a low period when (e.g., only if) problems are occurring with the RLM-RS configured with a high period. For example, the WTRU may monitor the RLM-RS configured with a low period if the WTRU fails to detect the RLM-RS configured with a high period above a quality threshold. This approach may be more battery-efficient. For example, the WTRU may monitor the RLM-RS configured with a low period only when a channel becomes busy. One or more high period RLM-RS resources may be dropped (e.g., due to LBT failure) when a channel becomes busy.

A WTRU may be configured to declare RLF if a channel the WTRU is using is busy, for example, for an extended period. As an example, the WTRU may declare RLF if the WTRU fails to acquire the channel for uplink after a given amount of time. The WTRU may declare RLF if the WTRU fails to acquire the channel for uplink after a number of attempts to acquire the channel have failed (e.g., a number of LBTs have failed). The WTRU may transmit in an unlicensed channel. The WTRU may be configured to verify that the channel is idle (e.g., for at least a sensing interval) before the WTRU transmits. LBT failure may include a situation where a channel is assessed to be not idle (e.g., based on an energy detection). For example, a LBT failure may correspond to a situation where a channel is assessed to be not idle for at least a determined time interval prior to a transmission.

A WTRU may be configured to declare RLF based on LBT failures (e.g., too many LBT failures). The WTRU may be configured to monitor channel availability for UL transmissions in a connected state. The WTRU may be configured to declare RLF based on triggers (e.g., triggers associated with channel availability). For example, the WTRU may be configured to declare RLF if the channel cannot be acquired for an UL transmission for a predefined time. The WTRU may be configured to declare RLF if the channel cannot be acquired for UL transmission for a number of attempts (e.g., due to LBT failure). The WTRU may avoid being stuck in a good but busy channel (e.g., using the approaches herein).

The WTRU may be configured to defer a transmission to a future time when the channel is free, for example, upon LBT failure. The WTRU may be configured to keep count of LBT failure occurrences that lead to deferred transmissions. As used herein, the terms LBT failure counter, skipped transmission counter, deferred transmission counter, transmission attempt counter may be used interchangeably. In an example, the WTRU may be configured to maintain a common LBT failure counter across one or more UL channels. For example, the common LBT failure counter may be maintained across all UL channels. The UL channels may include, for example, physical random access channel (PRACH), PUCCH and/or PUSCH. In an example, the WTRU may be configured to maintain a failed LBT counter, e.g., specific to the UL channel associated with the transmission. For example, the WTRU may maintain separate counters for one or more of PRACH, PUCCH and PUSCH channels. The WTRU may be configured to declare RLF when a maximum value (e.g., preconfigured/predefined) for at least one of the LBT failure counters is reached. The WTRU may be configured to declare RLF, for example, based on a sum of two or more counters reaching a maximum value.

A trigger related to RLF may be generated based on deferred preamble transmissions. A WTRU may trigger RLF based on deferred preamble transmissions (e.g., too many deferred preamble transmissions). A WTRU may be configured to determine (e.g., ensure) a success of LBT, for example, before the WTRU makes a preamble transmission. For example, the WTRU may use a counter keep count of a number of preamble transmissions that are deferred or skipped due to a failed LBT(s). The counter may be different from a preamble transmission counter or a power ramping counter (e.g. a skipped preamble transmission counter). The counter may be a skipped preamble transmission counter. The WTRU may be configured to increment the skipped preamble transmission counter if a preamble transmission is canceled upon LBT failure. The WTRU may be configured to trigger RLF if the skipped preamble transmission counter reaches a value (e.g., preconfigured value). The WTRU may reset the skipped preamble transmission counter if a random access response (RAR) is received (e.g., successfully). The WTRU may be configured to trigger RLF if the sum of the skipped preamble transmission counter and the preamble transmission counter is above a value (e.g., preconfigured value). The WTRU may be configured to increment the preamble transmission counter by a fractional value if a preamble transmission is skipped due to LBT failure. The fractional value may be less than one. The fractional value may be configured, for example, via RRC signaling or in system information broadcast.

The WTRU may trigger RLF, for example, upon expiration of a timer (e.g. a skipped preamble timer). The WTRU may be configured to start the timer when a preamble transmission is deferred, e.g., due to an LBT failure. The WTRU may stop the timer if lower layers indicate that the preamble is transmitted.

An indication about an LBT outcome and/or a status of a transmission may be defined and/or sent from lower layers to MAC (e.g., a MAC layer). As an example, the MAC layer may be used to increment the skipped preamble counter and/or may start a skipped preamble timer, for example, upon receiving an indication informing of a transmission failure due to LBT.

A trigger related to RLF may be generated based on deferred UL transmissions (e.g., too many deferred UL transmissions). A WTRU may be configured to determine (e.g., ensure) successful LBT, for example, before the WTRU makes a PUSCH and/or PUCCH transmission(s). The WTRU may perform LBT in a cell (e.g., operating in an unlicensed spectrum). The WTRU may determine to defer and/or skip an UL transmission, for example, based on a determination of a failed LBT. The WTRU may determine that the number of deferred UL transmissions exceeds a threshold. The WTRU may send an indication of RLF based on the determination that the number of the deferred UL transmissions exceeds the threshold. The WTRU may determine that UL access latency exceeds a threshold. The WTRU may send an indication of RLF based on the determination that the UL access latency exceeds the threshold. The uplink transmission may include MSG3 transmission or any other UL-SCH transmission. Examples for a skipped preamble transmission(s) (e.g., as described herein) may be applied for a skipped PUSCH and/or deferred PUCCH transmission(s). Counters and/or timers may be separate for PUCCH and PUSCH. The threshold may be associated with (e.g., specific to) an UL channel. The WTRU may be configured to maintain a counter for the deferred UI transmissions.

The WTRU may be configured to determine a fractional increment to an OOS counter as a function of a number of transmissions. The WTRU may be configured to determine a fractional increment to an OOS counter as a function of a number of skipped preamble transmissions. The WTRU may be configured to determine a fractional increment to an OOS counter as a function of a number of skipped PUSCH transmissions. The WTRU may be configured to determine a fractional increment to an OOS counter as a function of a number of skipped PUCCH transmissions. The WTRU may interpret an NS indication as an OOS indication if the number of skipped transmissions is above a threshold. The WTRU may interpret an NS indication as an OOS indication if the number of skipped preamble transmissions is above a threshold. The WTRU may interpret an NS indication as an OOS indication if the number of skipped PUSCH transmissions is above a threshold. The WTRU may interpret an NS indication as an OOS indication if the number of skipped PUCCH transmissions is above a threshold.

A WTRU may be configured to maintain a deferred UL transmission counter (e.g., an LBT failure counter). In examples, WTRU transmission occasions may be frequent or may occur close to each other. Incrementing the LBT failure counter upon every LBT failure may result in an early declaration of RLF, for example, if a common counter is configured for multiple UL channels. A WTRU may fractionally increment the LBT failure counter upon an LBT failure, and/or n LBT failures may result in increment of the counter. For example, the WTRU may fractionally increment the LBT failure counter upon each LBT failure. In examples, the WTRU may increment the LBT failure counter (e.g., once) upon n consecutive LBT failures. The n consecutive LBT failures may have no LBT success in between. The WTRU may be configured to refrain from incrementing the LBT failure counter if n consecutive LBT failures do not occur. The increment of the counter may correspond (e.g., be specific) to an UL channel.

The WTRU may be configured to increment an LBT failure counter as a function of a given UL channel. The WTRU may be configured to maintain a common counter for LBT failure during a UL transmission. For example, the common counter may be used for LBT failure during any UL transmission and/or for transmissions on any UL channel. The increments to the counter may be a function of a specific UL channel (e.g., specific properties or characteristics of a UL channel). As an example, the WTRU may be configured to increment the counter based on the periodicity of transmission occasions associated with a UL channel. For example, smaller increments may be added when LBT failure occurs during frequently occurring UL channels. Larger increments may be added when LBT failure occurs during less frequently occurring UL channels. The increments may be preconfigured (e.g., in a system information broadcast or RRC configuration). The WTRU may determine the increments, for example, based on a periodicity of transmission occasions associated with the UL channel.

A WTRU may be configured to implement rules to control when an LBT failure counter is incremented. For example, one or more timers may be used to determine whether the LBT failure counter is to be incremented based on an observed or detected criteria(ion). Using the one or more timers may avoid frequent increments to the LBT failure counter. In an example, the WTRU may be configured to increment the LBT failure counter at most once within a time interval. The WTRU may start a timer when the LBT failure counter is incremented. The WTRU may not increment the LBT failure counter during subsequent LBT failures if the timer is running. If the timer is not running or is expired and an LBT failure occurs, the WTRU may increment the LBT failure counter and/or start the timer again.

The WTRU may be configured to increment the LBT failure counter if n or more LBT failures occur within a time interval. For example, the WTRU may increment the LBT failure counter if n or more consecutive LBT failures are observed within a time interval.

The duration of a timer and/or the value of n may be configured by the system information broadcast or RRC configuration. In examples, the WTRU may be configured to determine the value of n and/or the timer based on a quality of service and/or a logical channel that triggered the UL transmission.

A WTRU may be configured to reset the LBT failure counter based on a certain criteria(ion). The WTRU may be configured to reset the LBT failure counter if the WTRU determines that the channel is available for transmission. For example, the WTRU may reset the LBT failure counter if CCA is successful. The WTRU may reset the LBT failure counter if a UL transmission is performed. The UL transmission may be, for example, a preamble, PUCCH or PUSCH transmission. The WTRU may reset the counter if N number of CCA successes are detected and/or N number of UL transmissions are performed. For example, the WTRU may be configured to refrain from resetting the counter when N CCA successes are not detected and/or N UL transmissions are not performed. The WTRU may stop the timer related to LBT failure counting if the counter is reset.

The WTRU may be configured to reset the LBT failure counter if a response to a preamble transmission (e.g., an RAR) is received.

A WTRU may be configured with a RLM behavior as a function of LBT failures. In examples, the function related to counting LBT failures and/or impacting the WTRU behavior based on LBT failures may be modeled as RLM (e.g., RLM process).

The WTRU may trigger RLF when the LBT counter value reaches a threshold (e.g., preconfigured maximum value). The WTRU may trigger RLF based on a combination of the LBT failure counter and the status of an RLM process (e.g., based on IS/OOS indications). For example, the WTRU may trigger RLF based on a maximum number of LBT failures when a timer related to RLM is running. The timer may be, for example, T310. For example, the WTRU may be configured to refrain from triggering RLF based on the maximum number of LBT failures when the timer related to RLM is not running.

In an example, when the LBT failure counter reaches a preconfigured value, the WTRU may start a timer. When a successful transmission (e.g., a preamble transmission and/or any other UL transmission) cannot be performed within the timer expiry, the WTRU may trigger RLF. One or more states of an RLM behavior may be configured for the WTRU. For example, the WTRU may be configured with two states of an RLM behavior. In a first state, the WTRU may monitor the status of the channel. If the LBT counter indicates that the channel is busy, the WTRU may enter a second state. In the second state (e.g., modeled as a recovery stage) the WTRU may attempt a successful transmission within a time period. If no UL transmissions are performed within the expiry of a timer, the WTRU may declare RLF.

A WTRU may be configured to perform BWP failure detection and/or recovery using autonomous BWP switching. A WTRU may be configured to perform LBT at the granularity of a BWP(s). Different BWPs associated with a serving cell may have varying channel status, load(s), or interferences. The WTRU may be configured to perform RLM based on the RLM-RS(s) confined to an active BWP. The WTRU may be configured to declare a BWP failure when an RLF is detected in the active BWP, for example based on one or more RLF triggers described herein. For example, a BWP failure may be declared when more than n RLM-RS resources have not been transmitted (e.g., for more than x indication periods). The WTRU may be configured to autonomously switch to a different BWP belonging to the same serving cell, e.g. when an RLF is detected in the active BWP. A WTRU may switch to a BWP that is chosen from a plurality of BWPs (e.g., preconfigured BWPs) for a WTRU. The WTRU may select the BWP based on the quality of the BWP(s) (e.g. based on SSB and/or CSI-RS measurement). The WTRU may select the BWP that has the earliest channel availability. The WTRU may select the BWP that has a low channel load and/or channel occupancy (e.g. based on RSSI and/or ZP-RS measurement). The WTRU may select the default BWP or fallback BWP (e.g., that is specifically preconfigured for the WTRU). The WTRU may indicate the autonomous BWP switch to the network, for example, using an RA process including a selection of a preamble that belongs to the BWP that the WTRU is switching to. The WTRU may indicate the reason for the autonomous BWP switch (e.g., channel busy for a predefined time or RSSI result).

A WTRU may be configured to take a corrective action when the WTRU receives an indication that the channel load is above a threshold. The corrective action may include, for example, at least one of declaring RLF or applying a stored configuration for handover (e.g., a conditional handover). The indication may include, for example, detecting that a configured RS is above a threshold or decoding DCI indicating a high load condition. The WTRU may apply the corrective action if the WTRU has failed to detect a RS (e.g. RLM-RS) above a threshold, or if T310 is running or has expired.

A channel status may be reported. A network may configure RLM-RS resources for a WTRU. A WTRU may be configured to report a BWP specific RSSI measurement for an active BWP and one or more configured BWP(s). A WTRU may be configured to report a BWP specific ZP-RS measurement for an active BWP and one or more configured BWP(s). The WTRU may be configured to trigger the report based on, for example, expiration of a periodic timer and/or based on a request from the network. The report may be configured as an event triggered report. The events may include, for example, an active BWP RSSI being above or below a threshold, an active BWP RSSI being above or below the RSSI of a configured BWP, a number of NS indications in an active BWP being above a threshold, or a number of skipped RLM-RS transmissions being above a threshold.

The WTRU may be configured with multiple RSs that are contained in different sub-bands of a given BWP. The WTRU may choose an RS from a sub-band (e.g., with the least interference) to perform RLM. Different parts of the BWP may experience different interferences, for example, if competing nodes use non-equal BWP.

The WTRU may be configured with a large set of RLM-RSs. The WTRU may be configured to select a subset of the RLM-RSs, for example, based on some pre-defined rules.

The WTRU may select a subset of resources from the large configured set of resources to monitor. For example, the WTRU may randomly select at a $T_{period\_interval}$ (e.g., each $T_{period\_interval}$) a subset of resources to monitor. The effect of interference may be randomized, for example, if it is assumed that spectrum occupation from neighboring nodes and/or CCA from the gNB follow a uniform distribution.

Configured RLM resources (e.g., each configured RLM resource or a configured set of RLM resources) may be associated with a certain monitoring periodicity. The WTRU may be configured to monitor resources (e.g., each resource) for a predefined time period. Diversity in the link monitoring may be introduced. Not transmitting RSs for a long period of time may not impact the reliability of the IS and/or OOS indications.

The presences of hidden nodes may be determined. A WTRU may be configured to perform CCA (e.g., measure RSSI threshold) in one or more predefined time windows (e.g., occurring at a preconfigured periodicity). The WTRU may receive the results of a CCA that is performed by the network during the same predefined time window and/or periodicity. The WTRU may receive the results in a broadcast message (e.g. SIB) or dedicated RRC signaling. The WTRU may compare the results of local channel sensing (e.g. CCA at the WTRU) and remote channel sensing (e.g. CCA at the network). The WTRU may determine whether there are one or more hidden nodes based on the comparison. The WTRU may determine that there are one or more hidden nodes if the local and remote CCA results do not match. The WTRU may be further configured to trigger a report indicating the presence of hidden nodes (e.g. when the mismatch of CCA results occur) to the network. The report may be via a RRC message or measurement report. The WTRU may consider the results of the determination whether there are hidden nodes to perform channel status aware RLM (e.g., as described herein).

What is claimed:

1. A wireless transmit/receive unit (WTRU), comprising:

a processor configured to:

determine a maximum number of listen before talk (LBT) failures value;

perform a plurality of LBT procedures associated with a first bandwidth part (BWP) of a serving cell;

determine a number of LBT failures associated with the first BWP of the serving cell that have occurred;

determine that the number of LBT failures associated with the first BWP of the serving cell has reached the determined maximum number of LBT failures value;

determine that a second BWP of the serving cell meets one or more characteristics, wherein the one or more characteristics comprise a channel availability associated with the second BWP;

autonomously select the second BWP of the serving cell based on the determined number of LBT failures associated with the first BWP of the serving cell reaching the determined maximum number of LBT failures value and on the channel availability associated with the second BWP;

perform a plurality of LBT procedures associated with the second BWP of the serving cell;

determine a number of LBT failures associated with the second BWP of the serving cell that have occurred;

determine that the number of LBT failures associated with the second BWP of the serving cell has reached the determined maximum number of LBT failures value; and declare radio link failure (RLF) after the determination that the number of LBT failures associated with the first BWP of the serving cell has reached the determined maximum number of LBT failures value and based on the determination that the number of LBT failures associated with the second BWP of the serving cell has reached the determined maximum number of LBT failures value.

2. The WTRU of claim 1, wherein the processor being configured to declare the RLF comprises the processor being configured to send an indication that RLF has occurred to a higher layer.

3. The WTRU of claim 1, wherein the processor being configured to determine that the second BWP of the serving cell meets the one or more characteristics comprises the processor being configured to determine that the second BWP of the serving cell has an earliest channel availability among a plurality of BWPs associated with the serving cell.

4. The WTRU of claim 1, wherein the processor is further configured to send, to a base station, information that indicates that the number of LBT failures associated with the first BWP of the serving cell has reached the determined maximum number of LBT failures value.

5. The WTRU of claim 1, wherein the processor is further configured to send, to a base station, information that indicates that the number of LBT failures associated with the second BWP of the serving cell has reached the determined maximum number of LBT failures value.

6. The WTRU of claim 1, wherein the serving cell comprises a plurality of BWPs, and the first BWP is an initial BWP of the plurality of BWPs.

7. The WTRU of claim 1, wherein the processor is configured to determine that the number of LBT failures associated with the first BWP of the serving cell has reached the determined maximum number of LBT failures value based on a counter that counts the number of LBT failures associated with the first BWP of the serving cell.

8. The WTRU of claim 7, wherein the processor is further configured to increment the counter based on an LBT failure of the number of LBT failures associated with the first BWP of the serving cell.

9. The WTRU of claim 1, wherein the processor is configured to:

determine that the number of LBT failures associated with the second BWP of the serving cell has reached the determined maximum number of LBT failures value based on a counter that counts the number of LBT failures associated with the second BWP of the serving cell; and increment the counter based on an LBT failure of the number of LBT failures associated with the second BWP of the serving cell.

10. The WTRU of claim 1, wherein the processor is configured to determine that the number of LBT failures associated with the first BWP of the serving cell has reached the determined maximum number of LBT failures value based on a timer.

11. A method implemented in a wireless transmit/receive unit (WTRU), the method comprising:

determining a maximum number of listen before talk (LBT) failures value;

performing a plurality of LBT procedures associated with a first bandwidth part (BWP) of a serving cell;

determining a number of LBT failures associated with the first BWP of the serving cell that have occurred;

determining that the number of LBT failures associated with the first BWP of the serving cell has reached the determined maximum number of LBT failures value;

determining that a second BWP of the serving cell meets one or more characteristics, wherein the one or more characteristics comprise a channel availability associated with the second BWP;

autonomously selecting the second BWP of the serving cell based on the determined number of LBT failures associated with the first BWP of the serving cell reaching the determined maximum number of LBT failures value and on the channel availability associated with the second BWP;

performing a plurality of LBT procedures associated with the second BWP of the serving cell;

determining a number of LBT failures associated with the second BWP of the serving cell that have occurred;

determining that the number of LBT failures associated with the second BWP of the serving cell has reached the determined maximum number of LBT failures value; and declaring radio link failure (RLF) after the determination that the number of LBT failures associated with the first BWP of the serving cell has reached the determined maximum number of LBT failures value and based on the determination that the number of LBT failures associated with the second BWP of the serving cell has reached the determined maximum number of LBT failures value.

12. The method of claim 11, wherein declaring the RLF comprises sending an indication that the RLF has occurred to a higher layer.

13. The method of claim 11, wherein determining that the second BWP of the serving cell meets the one or more characteristics comprises determining that the second BWP of the serving cell has an earliest channel availability among a plurality of BWPs associated with the serving cell.

14. The method of claim 11, further comprising sending, to a base station, information that indicates that the number of LBT failures associated with the first BWP of the serving cell has reached the determined maximum number of LBT failures value.

15. The method of claim 11, further comprising sending, to a base station, information that indicates that the number of LBT failures associated with the second BWP of the serving cell has reached the determined maximum number of LBT failures value.

16. The method of claim 11, wherein the serving cell comprises a plurality of BWPs, and the first BWP is an initial BWP of the plurality of BWPs.

17. The method of claim 11, further comprising determining that the number of LBT failures associated with the first BWP of the serving cell has reached the determined maximum number of LBT failures value based on a counter that counts the number of LBT failures associated with the first BWP of the serving cell.

18. The method of claim 17, further comprising incrementing the counter based on an LBT failure of the number of LBT failures associated with the first BWP of the serving cell.

19. The method of claim 11, further comprising:

determining that the number of LBT failures associated with the second BWP of the serving cell has reached the determined maximum number of LBT failures value based on a counter that counts the number of LBT failures associated with the second BWP of the serving cell; and incrementing the counter based on an LBT failure of the number of LBT failures associated with the second BWP of the serving cell.

20. The method of claim 11, further comprising determining that the number of LBT failures associated with the first BWP of the serving cell has reached the determined maximum number of LBT failures value based on a timer.

* * * * *